(12) United States Patent
Patterson et al.

(10) Patent No.: US 11,769,528 B2
(45) Date of Patent: Sep. 26, 2023

(54) SYSTEMS AND METHODS FOR AUTOMATING VIDEO EDITING

(71) Applicant: Visual Supply Company, Oakland, CA (US)

(72) Inventors: Geneviève Patterson, Nottingham, NH (US); Hannah Wensel, Los Angeles, CA (US)

(73) Assignee: Visual Supply Company, Oakland, CA (US)

( * ) Notice: Subject to any disclaimer, the term of this patent is extended or adjusted under 35 U.S.C. 154(b) by 0 days.

(21) Appl. No.: 17/189,865

(22) Filed: Mar. 2, 2021

(65) Prior Publication Data

US 2021/0272599 A1    Sep. 2, 2021

Related U.S. Application Data

(60) Provisional application No. 62/983,923, filed on Mar. 2, 2020.

(51) Int. Cl.
*G11B 27/031* (2006.01)
*G06N 3/045* (2023.01)

(52) U.S. Cl.
CPC .......... *G11B 27/031* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 8,577,210 B2 * | 11/2013 | Kashima | G06F 3/0482 386/278 |
| 9,146,942 B1 | 9/2015 | Hodges et al. | |
| 10,062,415 B2 * | 8/2018 | Eppolito | G11B 27/031 |
| 10,750,245 B1 * | 8/2020 | Zeiler | G06F 16/73 |
| 11,170,389 B2 * | 11/2021 | Wang | G11B 27/031 |
| 2007/0074115 A1 | 3/2007 | Patten et al. | |

(Continued)

OTHER PUBLICATIONS

International Search Report and Written Opinion dated May 21, 2021, in connection with International Application No. PCT/US2021/020424.

(Continued)

*Primary Examiner* — Gelek W Topgyal
(74) *Attorney, Agent, or Firm* — Wolf, Greenfield & Sacks, P.C.

(57) ABSTRACT

Provided are systems and methods for automatic video processing that employ machine learning models to process input video and understand user video content in a semantic and cultural context. This recognition enables the processing system to recognize interesting temporal events, and build narrative video sequences automatically, for example, by linking or interleaving temporal events or other content with film-based categorizations. In further embodiments, the implementation of the processing system is adapted to mobile computing platforms which can be distributed as an "app" within various app stores. In various example, the mobile apps turn everyday users into professional videographers. In further embodiments, music selection and dialog based editing can likewise be automated via machine learning models to create dynamic and interest professional quality video segments.

20 Claims, 28 Drawing Sheets

(56) References Cited

U.S. PATENT DOCUMENTS

| | | | |
|---|---|---|---|
| 2007/0192107 A1 | 8/2007 | Sitomer et al. | |
| 2012/0057852 A1* | 3/2012 | Devleeschouwer ... | H04N 5/268 |
| | | | 386/E5.028 |
| 2013/0031479 A1* | 1/2013 | Flowers ............... | G06F 3/0482 |
| | | | 715/716 |
| 2013/0195429 A1* | 8/2013 | Fay ........................ | H04L 41/22 |
| | | | 715/744 |
| 2013/0343729 A1* | 12/2013 | Rav-Acha ................ | H04N 9/87 |
| | | | 386/285 |
| 2014/0133834 A1* | 5/2014 | Shannon ............ | H04N 5/23222 |
| | | | 386/278 |
| 2014/0255009 A1* | 9/2014 | Svendsen ......... | H04N 21/47205 |
| | | | 386/280 |
| 2015/0208023 A1* | 7/2015 | Boyle .................. | G11B 27/034 |
| | | | 386/278 |
| 2016/0092561 A1* | 3/2016 | Liu ..................... | G06F 16/7837 |
| | | | 386/230 |
| 2016/0148407 A1 | 5/2016 | Hodges et al. | |
| 2017/0150235 A1 | 5/2017 | Mei et al. | |
| 2018/0068019 A1* | 3/2018 | Novikoff ................. | G06F 16/58 |
| 2018/0115706 A1* | 4/2018 | Kang ........................ | G06T 7/20 |
| 2019/0208124 A1* | 7/2019 | Newman ............ | H04N 5/23238 |
| 2019/0303403 A1* | 10/2019 | More ..................... | G06F 16/738 |
| 2019/0364211 A1* | 11/2019 | Chun ..................... | H04N 5/144 |
| 2020/0021718 A1* | 1/2020 | Barbu ................... | A61B 5/163 |
| 2020/0184278 A1* | 6/2020 | Zadeh .................. | G06K 9/6264 |
| 2021/0117685 A1* | 4/2021 | Sureshkumar .......... | G06F 40/30 |

OTHER PUBLICATIONS

[No Author Listed], Explore Computer Vision APIs. WWDC 2020. 9 pages. https://developer.apple.com/videos/play/wwdc2020/10673/ [Last accessed Sep. 13, 2022].

[No Author Listed], 50 Must-Know Stats About Video Marketing. Insivia Agile Marketing 2016. 12 pages. https://www.insivia.com/50-must-know-stats-about-video-marketing-2016/ [Last accessed May 5, 2021].

[No Author Listed], Mobile Fact Sheet. Pew Research Center. Apr. 2021. 6 pages. http://www.pewinternet.org/fact-sheet/mobile/ [Last accessed May 5, 2021].

[No Author Listed], NSF Seed Fund. Phase I. 2018. 3 pages. bootcamp.https://seedfund.nsf.gov/resources/awardees/phase-1/bootcamp/ [Last accessed May 5, 2021].

[No Author Listed], The State of Traditional TV: Updated with Q2 2017 Data. Dec. 13, 2017. 15 pages. https://www.marketingcharts.com/featured-24817 [Last accessed May 5, 2021].

Abu-El-Haija et al., Youtube—8m: A large-scale video classification benchmark. arXiv:1609.08675v1 [cs.CV]. Sep. 27, 2016. 10 pages.

Bilen et al., Dynamic image networks for action recognition. Proceedings of the IEEE Conference on Computer Vision and Pattern Recognition. 2016; 3034-42.

Buolamwini et al., Gender Shades: Intersectional Accuracy Disparities in Commercial Gender Classification. Proceedings of Machine Learning Research. 2018;81:1-15.

Chan et al., Listen, Attend and Spell. arXiv:1508.01211v2 [cs.CL] Aug. 20, 2015. 16 pages.

Christensen et al., Know your customers' jobs to be done. Harvard Business review 94.9 (2016) 54:14 pages.

Davis et al., Visual Rhythm and Beat. ACM Trans. Graph. 37.4 (2018) 122-1.

Deng et al., ImageNet: A Large-Scale Hierarchical Image Database. ReaserchGate. CVPR. IEEE. Jun. 2009. 9 Pages.

Donahue et al., Long-term recurrent convolutional networks for visual recognition and description. Proceedings of the IEEE conference on computer vision and pattern recognition. 2015. 2625-2634.

Fouhey et al., From Lifestyle Vlogs to Everyday Interactions. arXiv:1712.02310 [cs.CV]. Dec. 6, 2017. 11 pages.

Gallello, My favorite usability testing question. Medium. Nov. 7, 2017. 2 pages. https://medium.com/@cgallello/my-favorite-usability-test-question-62fbe3aa9373 [Last accessed May 5, 2021].

Gandhi et al. Multi-clip video editing from a single viewpoint. Proceedings of the 11$^{th}$ European Conference on Visual Media Production. ACM. 2014; 9.

Gandhi et al., A computational framework for vertical video editing. 4$^{th}$ Workshop on Intelligent Camera Control, Cinematography and Editing. Eurographics Association. 2015;31-37.

Goyal et al., The "something something" video database for learning and evaluating visual common sense. arXiv:1706.04261v2 [cs.CV] Jun. 15, 2017. 21 pages.

Gu et al., AVA: A video dataset of spatio-temporally localized atomic visual actions. arXiv:1705.08421v4 [cs.CV] Apr. 30, 2018. 15 pages.

Haimson et al., What makes live events engaging on Facebook Live, Periscope, and Snapchat. Proceedings of the 2017 CHI Conference on Human Factors in Computing Systems. ACM. 2017; 48-60.

He et al., Mask R-CNN. arXiv:1703.06870v3 [cs.CV]. Jan. 24, 2018. 12 pages.

Johansson-Sköldberg et al., Design thinking: past, present, and possible futures. Creativity and innovation management. 22.2 (2013): 121-146.

Karayev et al., Recognizing image style. arXiv preprint arXiv:1311.3715v3:23 Jul. 23, 2014. 20 pages.

Kot et al., Image and Video Source Class Identification. Digital Image Forensics. Springer, New York, NY, 2013. Jul. 31, 2012: 157-178.

Leake et al. Computational video editing for dialogue-driven scenes. ACM Transactions on Graphic (TOG). 2017; 36(130).

Liao et al., Audeosynth: music-driven video montage. ACM Transactions on Graphics (TOG) 34.4. (2015): 1-10.

Lin et al., Chinese Story Generation Using Conditional Generative Adversarial Network. 2020 International Conference on Artificial Intelligence in Information and Communication (ICAIIC), Fukuoka, Japan. 2020: 457-62.

Lin et al., Microsoft COCO: Common Objects in Context. arXiv:1405.0312v3 [cs.CV] Feb. 21, 2015. 15 pages.

Lino et al., Computational model of film editing for interactive storytelling. International Conference on Interactive Digital Storytelling. Springer. 3022; 305-308.

Lu et al. Story-driven summarization for egocentric video. Computer Vision and Pattern Recognition (CVPR). 2013 IEEE Conference on. IEEE. 2013; 2714-2721.

Manyika et al., Independent Work: Choice, Necessity, and the Gig Economy. McKinsey Global Institute. Oct. 2016. 148 pages.

Marshall, By 2020, 75% of Mobile Traffic will be Video [Cisco Study]. Feb. 2016. 6 pages. https://tubularinsights.com/2020-mobile-video-traffic [Last accessed May 5, 2021].

Marszalek, et al., Actions in Context. IEEE Conference on Computer Vision & Patterson Recognition. Jun. 2009; 2929-2936.

McCue, Top 10 Video Marketing Trends and Statistics Roundup 2017. Sep. 22, 2017. www.forbes.com/sites/tjmccue/2017/09/22/top-10-vieo-marketing-trends-and-statistics-roundup-2017 [Last Accessed May 5, 2021].

McCue. Video Marketing in 2018 Continues to Explode as Way to Reach Customers. Jun. 22, 2018. www.forbes.com/sites/tjmccue/2018/06/22/video-marketing-2018-trends-continues-to-explode-as-the-way-to-reach-customers [Last accessed May 5, 2021].

Merabti et al. A virtual director inspired by real directors. AAA! Workshop on Intelligent Cinematography and Editing. 2014; 27:28-36.

Merabti et al. A virtual director using hidden markov models. Computer Graphics Forum. Wiley Online Library. 2016; 35(8):51-67.

Mithun et al., Learning Joint Embedding with Multimodal Cues for Cross-Modal Video-Text Retrieval. ICMR. Jun. 11, 2018. 9 pages.

Monfort et al., Moments in Time Dataset: One Million Videos for Event Understanding. ArXIV:1801.03150v3 [cs.CV] Feb. 16, 2019. 8 pages.

Murch, In the blink of an eye: A perspective on film editing. Silman-James Press, 2001; 20 pages.

(56) References Cited

OTHER PUBLICATIONS

Naderiparizi et al., Glimpse: A programmable early-discard camera architecture for continuous mobile vision. Proceedings of the 15$^{th}$ Annual International Conference on Mobile Systems, Applications, and Services. ACM. 2017; 292-305.

Nagarajan et al., Attributes as operators: factorizing unseen attribute-object compositions. ECCV. 2018. 17 pages.

Ngamkan et al., Building Models for Mobile Video Understanding. ICLR 2019. 4 pages.

Nguyen et al., The open world of micro-videos. arXiv:1603.094392v2 [cs.CV] Apr. 1, 2016. 17 pages.

Nieto et al., Systematic Exploration of Computational Music Structure Research. ISMIR. Aug. 1, 2016. 7 pages.

Owens, Measure your product's perceived usability with one simple number. Dec. 2016. 5 pages. https://medium.theuxblog.com/measure-your-products-usability-with-one-simple-number-3ecef1cb757e [Last accessed May 5, 2021].

Pan et al., Recurrent residual module for fast inference in videos. Proceedings of the IEEE Conference on Computer Vision and Pattern Recognition. 2018; 1536-1545.

Patterson et al., Coco attributes: Attributes for people, animals, and objects. European Conference on Computer Vision. Springer. 2016; 85-100.

Patterson et al., Sun attribute database: Discovering, annotating, and recognizing scene attributes. Brown university. 2012. 8 pages.

Patterson et al., The SUN attribute Database: Beyond Categories for Deeper Scene Understanding. Int J. Comput Vis. Jan. 18, 2014;108: 59-81.

Patterson et al., Tropel: Crowdsourcing detectors with minimal training. HCOMP. 2015; 150-159.

Pavel et al., Vidcrit: Video-based asynchronous video review. Proceedings of the 29$^{th}$ Annual Symposium on User Interface Software and Technology. ACM. 2016: 517-528.

Pennington et al., GloVe: Global Vectors for Word Representation. EMNLP. Oct. 2014. 1532-1543.

Ringer et al., Deep unsupervised multi-view detection of video game stream highlights. arXiv:1807.09715v1. Jul. 25, 2018. 6 pages.

Ronchi et al., Benchmarking and error diagnosis in multi-instance pose estimation IEEE on Computer Vision and Pattern Recognition. 2018. 4510-4520.

Salazar, Diary Studies: Understanding Long-Term User Behavior and Experiences. NN/g Nielsen Norman Group. Jun. 5, 2016. 6 pages.

Sandler et al., MobileNetV2: Inverted Residuals and Linear Bottlenecks. IEEE 2018. 4510-4520.

Schalkwyk, Google https://ai.googleblog.com/2019/03/an-all-neural-on-device-speech.html [Last accessed May 5, 2021].

Simonyan et al., Two-stream convolutional networks for action recognition in videos. Advances in neural information processing systems. 2014; 568-576.

Spangler, Cord-Cutting Explodes: 22 Million U.S. Adults Will Have Canceled Cable, Satellite TV by End of 2017. Variety. Sep. 2017. https://variety.com/2017/biz/news/cord-cutting-2017-estimtes-cancel-cable-satellite-tv-1202556594/. [Last accessed May 5, 2021].

Suris et al., Cross-Modal Embeddings for Video and Audio Retrieval. arXiv:1801.02200v1 [cs.IR]. Jan. 7, 2018. 6 pages.

Swanson, Instagram and Snapchat are Most Popular Social Networks for Teens; Black Teens are Most Active on Social Media, Messaging Apps. Associated Press—NORC. Apr. 9, 2015. 18 pages.

Tankovska. Instagram-Statistics & Facts. Statista. Jun. 4, 2021. 8 pages.

Tran et al., Learning spatiotemporal features with 3d convolutional networks. Computer Vision (ICCV). 2015 IEEE International Conference on. IEEE. 2015: 4489-4497.

Truong et al., Quickcut: An interactive tool for editing narrated video. UIST. 2016: 497-507.

Turner, How many smartphones are in the world? Bank My Cell. May 2021. 16 pages. https://www.bankmycell.com/blog/how-many-phones-are-in-the-world [Last accessed May 5, 2021].

Zazelenchuk, Data collection for usability research. May 5, 2008. 5 pages. https://www.userfocus.co.uk/articles.dataloggingtools.html [Last accessed May 5, 2021].

Zhang, The Importance of Cameras in the Smartphone War. Samsung. PetaPixel. Feb. 12, 2015. 11 pages.

Zhou et al., Places: A 10 million image database for scene recognition. IEEE transactions on pattern analysis and machine intelligence. 40.6 (2017): 1452-1464.

\* cited by examiner

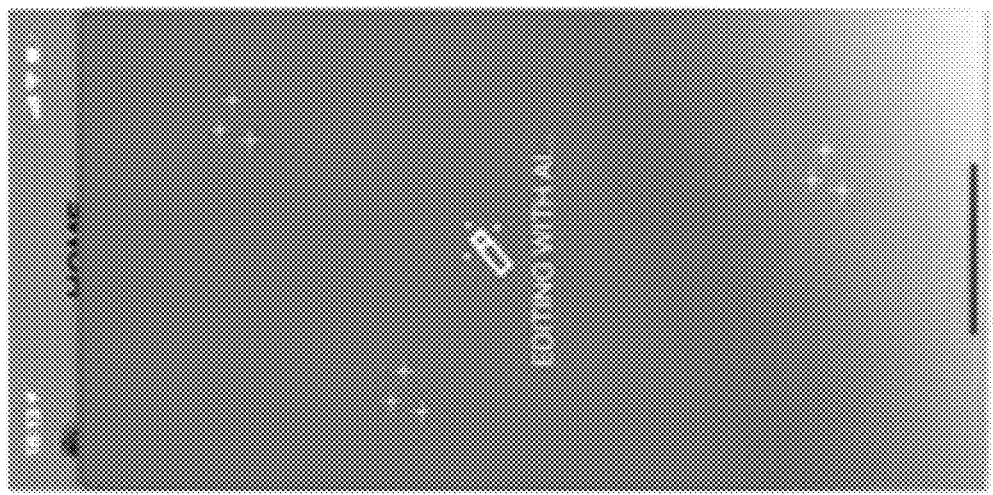
FIG. 3A

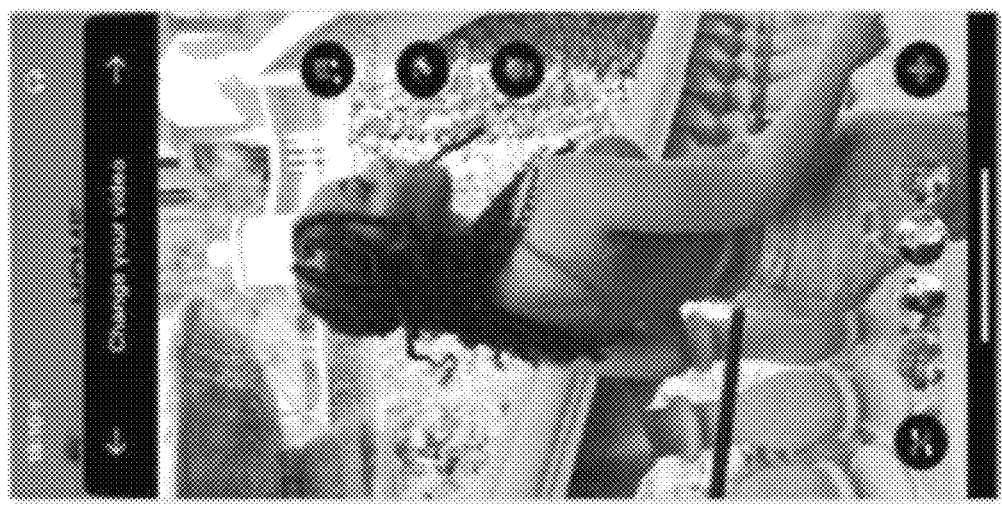
FIG. 3B

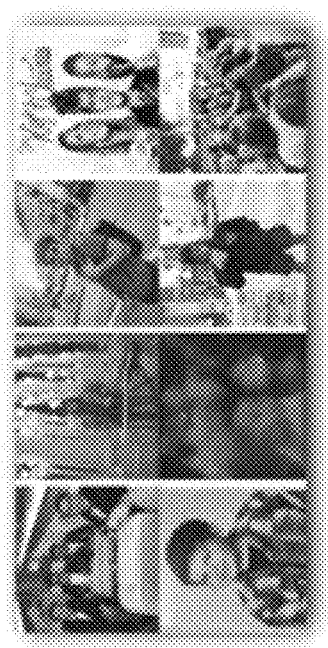
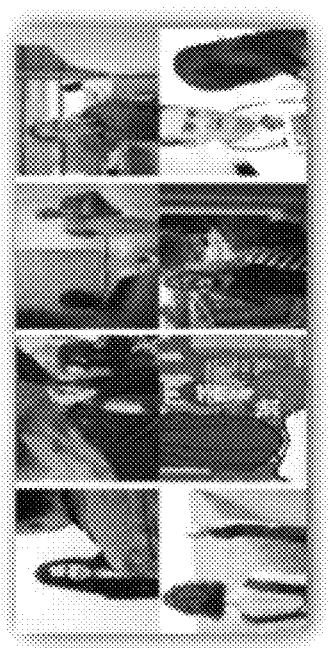
FIG. 9

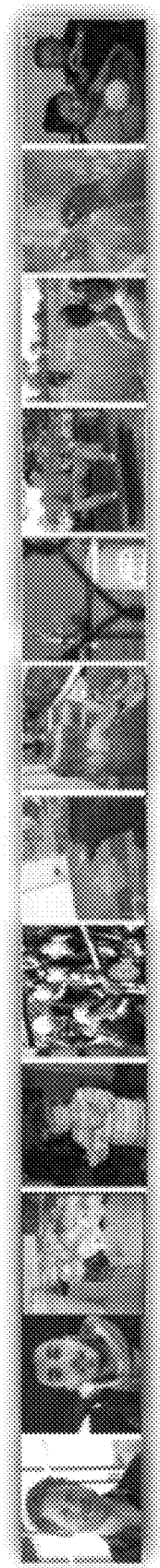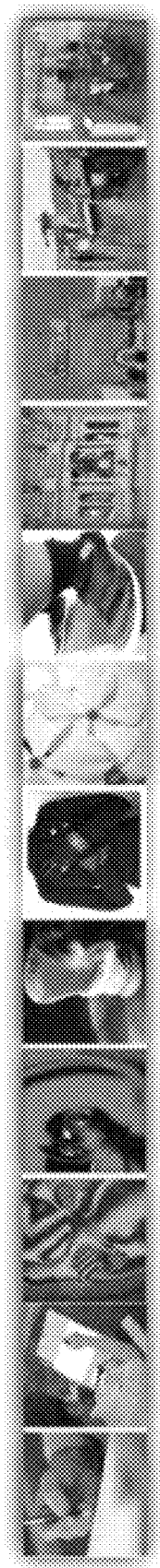
FIG. 10

FIGURE 29

SYSTEMS AND METHODS FOR AUTOMATING VIDEO EDITING

RELATED APPLICATIONS

This application claims priority under 35 U.S.C. 119(e) to U.S. Provisional Application Ser. No. 62/983,923 entitled "SYSTEMS AND METHODS FOR AUTOMATING VIDEO EDITING," filed on Mar. 2, 2020, which application is incorporated herein by reference in its entirety.

BACKGROUND

While modern consumers over the world over have recently begun to expect (and regularly use) high-quality photographic aids and post-processing tools to make images taken on portable devices look more professionals, this is not the case for video. Recent market trends have provided significant enhancement in hardware and video implementation. In spite of technical advances, there has been little of no movement in the adoption of professional video editing.

SUMMARY

The inventors have realized that many reasons exist for the limited adoption of enhanced editing tools in the video processing space. For example, the art of video post-production (a.k.a. video "editing") is viewed as extremely difficult to learn, and most conventional tools for this task are designed for, and exist only on, desktop computers based on the perception that desktop processing power is required for such editing. Further, conventional editing tools for mobile devices are fraught with issues, and difficult to use.

Stated broadly, various aspects resolve some of the issues associated with conventional video editing, by providing editing applications and/or suites that can be executed on mobile devices, and further that provide automated tools for accepting and editing user video with minimal or no user input (beyond providing video to be edited). According to various embodiments, users can supply video to be edited, and the editing functionality can identify specific content and film-based classification of video segments within the supplied video. In some embodiments, machine learning classifiers process the video to build film-based classification of video segments, and further use the classifications to determine automatic editing operations. In some examples, once the application completes the classification and automatic editing, the result is a professional grade video output. In further examples, the editing application is configured to build a "rough-cut" video from a given user input source. The system can then accept and/or employ user input on the rough-cut video to further refine and create a final output video. In further aspects, the rough-cut implementations can use additional machine learning models to automatically generate "fine tune" edits that may be used as selections to present to users in the application, and/or to automatically apply to a rough-cut version to yield a final version of the video. In still other embodiments, the machine learning functionality is configured to edit user video based at least in part on narrative generation and temporal event recognition. These features are simply unavailable in various conventional editing systems.

Although conventional approaches exist that can produce video clips, current implementations are limited to random montages of input clips or random aggregations of static photos with some integration of sound/music. Various embodiments significantly enhance the functionality and the output generated over convention random montage implementations, and provide intelligence when automatically editing video to yield a narrative component and/or to recognize and emphasize impactful elements within user source video.

According to one aspect, a video processing system is provided. The system comprises a user interface component, executed by at least one processor, configured to accept user sourced video as input; a video processing component, executed by at least one processor, configured to edit, automatically, segments of the video input responsive to selection in the user interface and display an automatically edited sequence of video.

According to another aspect, another video processing system is provided. The system comprises a user interface component, executed by at least one processor, configured to accept user sourced video as input; display editing operations, including at least one automatic editing function; a video processing component, executed by at least one processor, configured to transform the video input into a semantic embedding space and classify the transformed video into at least contextual categories and spatial layout categories; edit automatically segments of the video input; link or interleave video segments including the edited segments based at least in part on the categories to generate a sequencing of video; and wherein the user interface component is further configured to display the sequence of video.

According to one embodiment, either system further comprises a narrative component configured to identify a narrative goal, and define the sequence video to convey the narrative goal. According to one embodiment of either system, the video processing component includes at least a first neural network configured to transform the video input into a semantic embedding space. According to one embodiment, the first neural network comprises a convolutional neural network. According to one embodiment, the video processing component further comprises a second neural network configured to determine a narrative goal associated with the user sourced video or the sequence of video to be displayed. According to one embodiment, the second neural network comprises a long term short term memory recurrent network.

According to one aspect, a video processing system is provided. The system comprises a user interface component, executed by at least one processor, configured to accept user sourced video as input and display editing operations, including at least one automatic editing function. The system further comprises a video processing component, executed by the at least one processor, configured to transform the video input into a semantic embedding space and classify the transformed video into at least one of contextual categories or spatial layout categories; edit automatically segments of the video input; link or interleave video segments including the edited segments based at least in part on the contextual categories to generate a sequencing of video; and wherein the user interface component is further configured to generate a rough-cut video output including the sequence of video.

According to one embodiment, the system further comprises a narrative component configured to identify a narrative goal and define the sequence video to convey the narrative goal. According to one embodiment, the video processing component includes at least a first neural network configured to transform the video input into a semantic embedding space. According to one embodiment, the first neural network comprises a convolutional neural network.

According to one embodiment, the first neural network is configured to classify user video into visual concept categories. According to one embodiment, the video processing component further comprises a second neural network configured to determine a narrative goal associated with the user sourced video or the sequence of video to be displayed. According to one embodiment, the second neural network comprises a long term short term memory recurrent network. According to one embodiment, the system further comprises a second neural network configured to classify visual beats within user sourced video. According to one embodiment, the video processing component is further configured to automatically select at least one soundtrack for the user sourced video. According to one embodiment, the video processing component is configured to re-time user sourced video based on aligning the visual beats with music beats of the at least one soundtrack.

According to one aspect, a computer implemented method for automatic video processing is provided. The method comprises generating, by at least one processor, a user interface; accepting, via the user interface, user sourced video as input; display, by the at least one processor, editing operations within the user interface, including an act of displaying at least one automatic editing function; transforming, by the at least one processor, the video input into a semantic embedding space, responsive to execution of the at least one automatic editing function; classifying, by the at least one processor, the transformed video into at least one of contextual categories or spatial layout categories; editing, by the at least one processor, automatically segments of the video input; linking or interleaving, by the at least one processor, video segments including the edited segments based at least in part on the contextual categories to generate a sequencing of video; and generating, by the at least one processor, a rough-cut video output including the sequencing of video.

According to one embodiment, the method further comprises: identifying, by the at least one processor, a narrative goal; and defining, by the at least one processor, the sequence video to convey the narrative goal. According to one embodiment, the method further comprises executing at least a first neural network configured to transform the video input into a semantic embedding space. According to one embodiment, the first neural network comprises a convolutional neural network. According to one embodiment, the method further comprises classifying user video into visual concept categories with the first neural network. According to one embodiment, the method further comprises determining, by a second neural network, a narrative goal associated with the user sourced video or the sequence of video to be displayed. According to one embodiment, the second neural network comprises a long term short term memory recurrent network. According to one embodiment, the method further comprises classifying, by a third neural network, visual beats within user sourced video. According to one embodiment, the method further comprises automatically selecting at least one soundtrack for the user sourced video. According to one embodiment, the method further comprises re-timing user sourced video based on aligning the visual beats with music beats of the at least one soundtrack.

BRIEF DESCRIPTION OF THE FIGURES

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 3A-B illustrate a user experience on a processing system, according to one embodiment;

FIG. 9 illustrate examples of layout recognition, according to one embodiment;

FIG. 10 illustrates example additional classifications, according to one embodiment;

FIG. 29 is a diagram of screen captures, according to one embodiment;

DETAILED DESCRIPTION

As discussed, current commercial solutions for automated editing produce at best a random montage of a user's video clips. Various embodiments of an automated video processing system deliver a solution that exploits the power of recent advances in computer vision and machine learning. For example, an automatic processing system employs machine learning models configured to process input video and understand user video content in a semantic and cultural context. This recognition enables the processing system to recognize interesting temporal events, and build narrative video sequences automatically, for example, by linking or interleaving temporal events or other content with film-based categorizations. In further embodiments, the implementation of the processing system is adapted to mobile computing platforms (e.g., iOS, ANDROID, GOOGLE, etc.) by adapting computer vision techniques for use in mobile applications. In broader aspects, the mobile implementation turns everyday users into professional videographers.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
FIG. 1 shows example screen captures and editing functionality, according to one embodiment.

FIG. 1 illustrates the functionality delivered by an editing application incorporating automatic and automated intelligence facilitated editing functions. In various embodiments, a user can select a user video and build a professional video clip in a few as a single click in an automatic video editing application executing on a mobile device. At 102, an example device and selected video are shown. At 104, the selected video is being analyzed for contextual information that can be matched to shared and/or stored video segments by trained machine learning models, and the resulting matches can be used to create a final video clip having a variety of edited effects and/or new video segments that collectively tell a video based narrative (e.g., 106). Shown at 108 and 109 are example user avatars used for a publishing and content sharing platform that can be part of the processing system, in various embodiments. Each can be associated with video clip content and/or shared movies, for example, that have been developed through the processing application. The development through the processing application can include machine learning analysis and categorization of various elements of processed video. These categorizations/classifications (e.g., contextual, temporal, film based, etc.) can be linked to various video segments and further be used to build narrative sequences of new video. Additionally, the processing system and/or publication platform can track and train on editing done to various elements of published video. For example, user reviewed and/or approved edits to respective video or video segment can be used to train intelligent models and/or increase the emphasis in updating training models such that the approved video edits are determinable by various machine learning algorithms applied to subsequent video.

Figure 2:
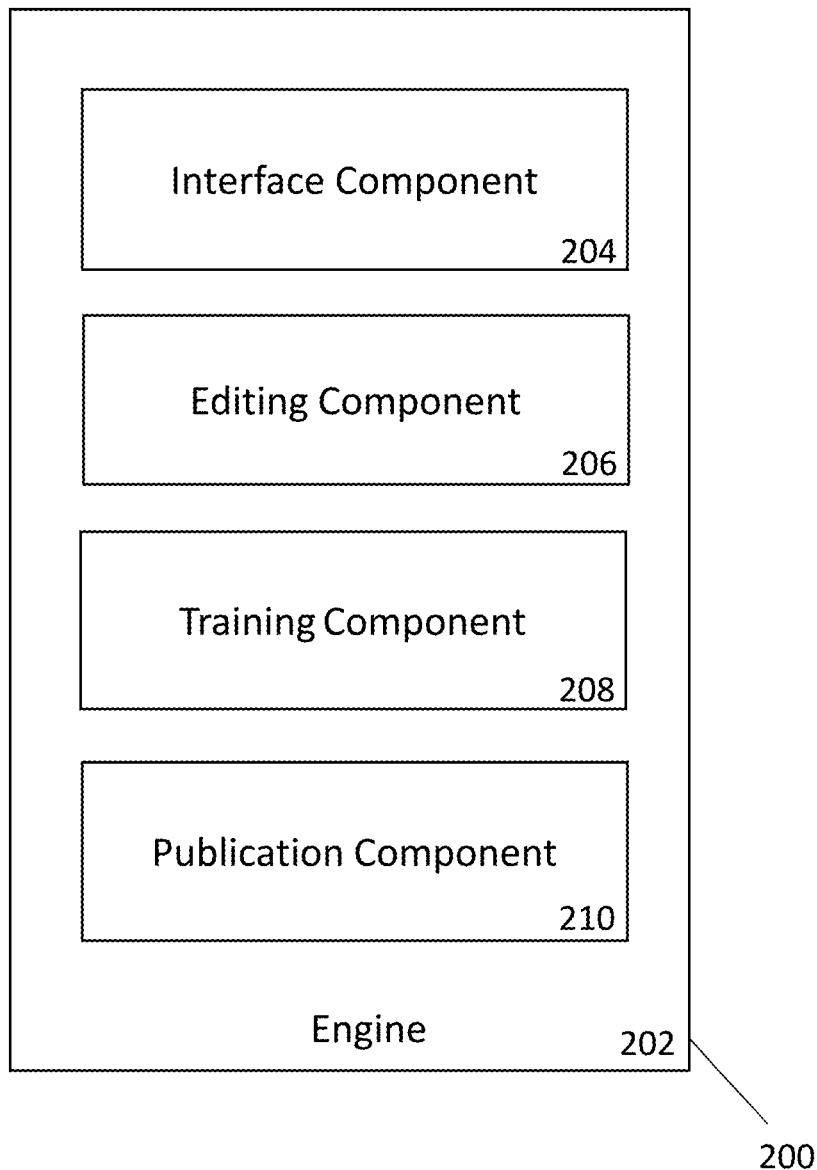
FIG. 2 is an example block diagram of system components in a processing system, according to one embodiment.

FIG. 2 is an example block diagram of a processing system 200. According to various embodiments, the processing system can include a mobile application component configured to instantiate and/or executed the described components. In further embodiments, the process system can also include server or cloud components, for example, to house published video content, and/or to update trained processing models, among other options.

According to some embodiments, the processing system 200 can include a processing engine 202 that can be configured to execute any of the functions disclosed herein. In further embodiments, the processing system 200 and/or engine 202 can be configured to call or instantiate a variety of components that process respective functions of the processing system. In addition and/or alternative, the system and/or engine can also execute such functions without the identified components.

According to one embodiment, the system 200 can include an interface component 204 configured to generate a user interface for display on a user's computer system (e.g. mobile device, desktop, portable device, etc.). According to one embodiment, the interface component 204 can generate interface displays associated with a mobile application for editing video. For example, the interface displays are configured to access mobile device functionality and content storage (e.g., photos, videos, etc.). The user can select any video on their device and trigger editing functionality of the processing system.

According to one embodiment, the processing system can include an editing component 206. The editing component can be configured to generate, automatically, edits on input video (e.g., received from an interface component (e.g., 204)). In various embodiments, the editing component 206 can include any number of machine learning models. The machine learning models are configured to process input video into an embedding space and categorize segments of video based on the processing done by the machine learning models. For example, the machine learning models can include classifiers for processing input video that identify important and/or related video segments, and models configured to classifying those video segments into semantic embedding features, temporal sequence features, narrative features, etc. In some examples, the machine learning models use a taxonomy of cinematic concepts to classify user input video. Once classified, the editing component 206 can be configured to identify appropriate edits to any video segment, interleave additional video segments, where the additional video segments can be sourced from the user's device, from a publication platform, among other options. In other examples, the machine learning models are configured to implement active learning and bootstrap image and video classifiers such that the model can automatically identify cinematic shot-type categories, semantic embedding features, temporal sequence features, narrative features, etc. In another example, the machine learning models are trained to recognize temporal elements and the localize the temporal events within an input video. In further embodiments, the machine learning models can apply multiple architectures to the video processing task. For example, convolutional neural networks can be applied to process input video as well as other neural networks (described in greater detail below) designed to output matches to cinematic, cultural, emotional, and other relevant concepts in a semantic embedding space.

According to further embodiments, the machine learning models are configured to generate narratives based on the editing executed by the editing component 206. Such narratives provide a story-like progression of video cuts that can be linked to narrative concepts and/or context derived from the machine learning models. In various embodiments, the processing system is configured to provide a rough-cut video with a narrative sequence which can be presented for approval by an end-user. Once approved, the final video and the processing used to develop it can be used to further refine training data and/or the various machine learning models, and/or weightings/analysis, and improve subsequent editing.

According to some embodiments, the processing system 200 can include a training component 208 configured to create new machine learning models and/or update existing machine learning models. In one example the training component 208 is configured to build new training data sets responsive to user activity on the processing system 200. In further example, the training component 208 can be configured to train various models prior to their use on a mobile application. Such pre-trained models can be used with a distributed mobile application and can be updated to any distributed application. In various examples, pre-trained models can be developed on robust systems and distributed to mobile devices with less processing power. In one example, the processing system can include a plurality of pre-trained models configured to recognize temporal events in input video, emotional events in input video, film-based events in input video, contextual events, and/or cinematic events, among other options.

According to further examples, the machine learning models of the editing component 206 are configured to define a semantic embedding space that contains object, person, scene attributes, scene categories, and object categories. Once represented in the semantic embedding space, the processing system can group related and/or like video segments based on nearest neighbor analysis in the semantic space. As discussed, any of the machine learning models can be updated and/or new training data sets generated for retraining existing models (e.g. via training component 208).

Such updates can occur based on generation of final video cuts and/or rough-cut generation, which may occur with or without user approval.

Once output video is generated by the processing system users can consume the generated video clip. In some embodiments, the users can access functionality provided by the interface component 204 to share generated video on a publication platform. According to one embodiment, the processing system 200 can include a publication component 210 configured to enable sharing functionality. For example, the user can access the processing system 200 and designate a generated video as publicly available and/or publish the generated video to one or more users. In further embodiments, the processing system is able to access the publication platform and related video clips to integrate such content into suggested edits (e.g. for example suggested by an adding component 206). In still other embodiments, various social media site can become sources for video content, source for training data, and/or can be explicitly linked by a user of the processing application.

Example Application Functionality

Various embodiments of the processing system include streamlined user interfaces, that enable sophisticated user editing in as few as a single click. FIGS. 3A-B illustrate an example user experience, where the user accesses their saved video on their device through a processing application (e.g., 302). In this example, a user can select any number of video clips and/or images. At 304, the application transforms the content into a semantic embedding space and generates a rough-cut of a new video output including a series of video edits (e.g., temporal cuts, narrative transitions, trimmed video segments, etc.) at 306. The user can accept the rough-cut and/or make modifications to the displayed output. If approved, the user can access the application to publish the newly generate content at 308. For example, publication makes a generated video available for use by other users on the platform.

Figure 3C:
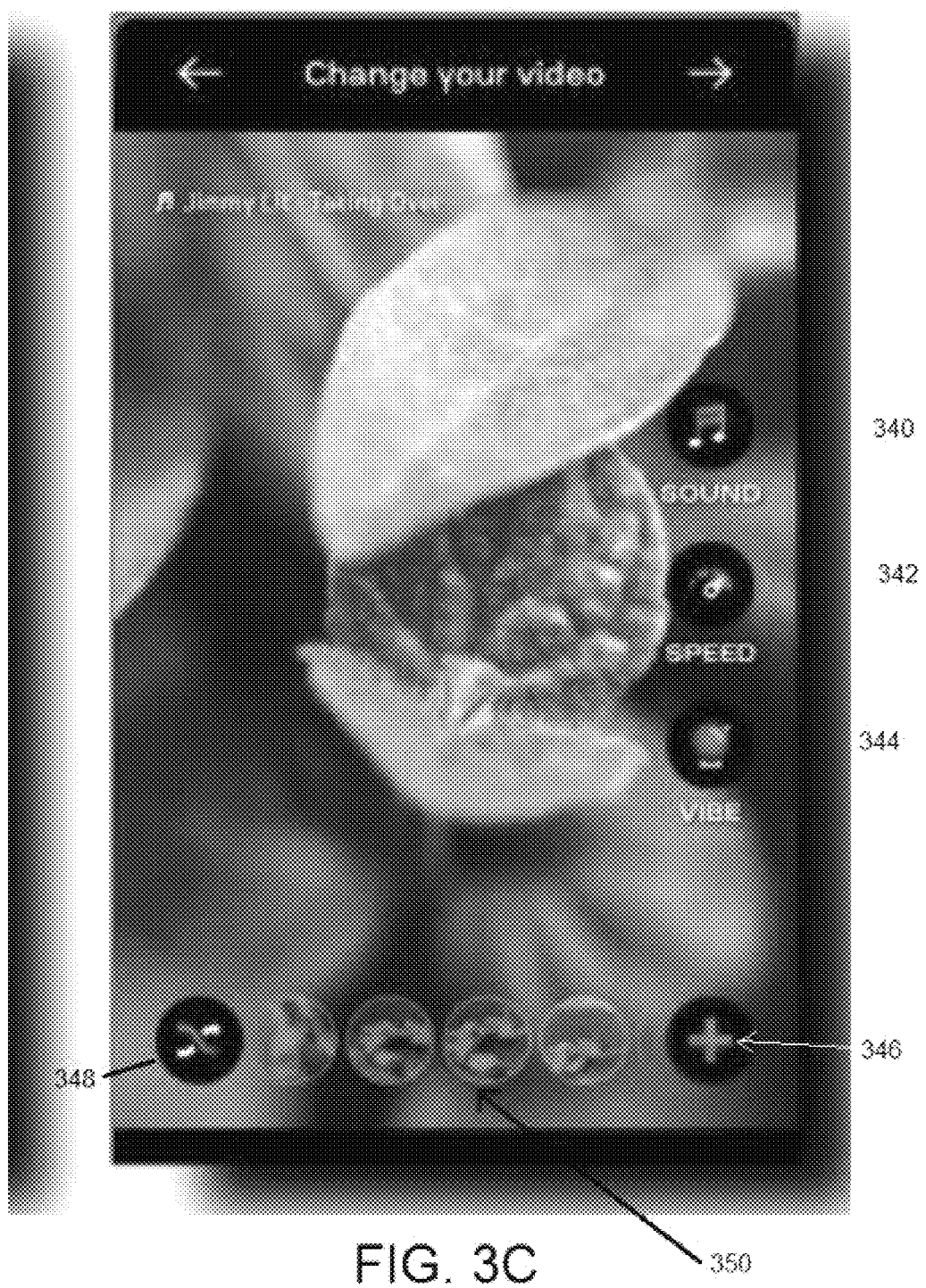
FIG. 3C is an example screen capture, according to one embodiment.

Shown in FIG. 3C is another example of screen captures showing a rough-cut video produced by the processing system. As shown, the user is able to review, accept, and/or alter the produced rough-cut. For example, the user can edit the sound at 340, preserve original sound from the video source, change the vibe at 344 (e.g., alter video effects, lighting, focus, etc.), change the speed of video and transitions between selected narrative video segments at 344, among other options. In further example, the ordering of video segments can be adjusted based on selection within area 350, randomized and/or re-ordered at 348, among other options.

Figure 4:
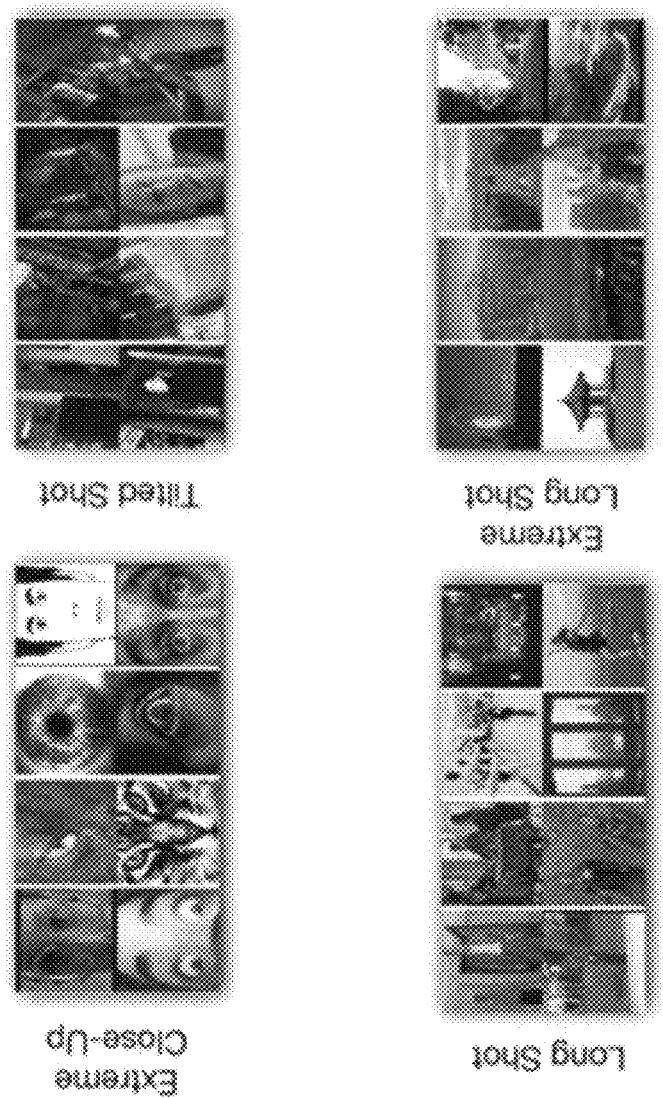
FIG. 4 illustrates example categories assigned by a classification network, according to one embodiment.

In some embodiments, the user interface provides tools to allow users to change the suggested soundtrack (sound), pace of edit cuts (speed), or the color grading and visual effects applied to the output video (vibe). In additional embodiments, users can also remix the video to generate a new rough-cut or add new footage. Once the user is satisfied with their creation, they can continue to a share view in the user interface, where they can upload their video to their user profile and save their new creation to their own camera roll and/or to a publication platform Various embodiments can employ a number of artificial intelligence classifiers to process user input video. FIG. 4 illustrates example images from user video that are classified together under the example categories. In some embodiments, a set of neural network classifiers are employed to identify video segments based on spatial layout dependent categories/classification (e.g., tilted shot, long shot). For example, video segment that contain objects larger than the frame can be classified as extreme close-up, video segments with fine-grained distinctions classified as long vs. extreme long shot, and other spatial categories can be used to train/classify user video. For example, the classifier can identify rack focus shots (e.g., changing focus during video sequence), master shots, high angle, low angle, etc. These categorizations can be used to identify like video segments, and the similar segments can be selected, grouped, and/or sequence to develop narrative based automatic editing. Various embodiments of the processing system can employ machine learning models for spatial classification coupled with cinematic concept classification to enable narrative construction in output video.

Figure 5:
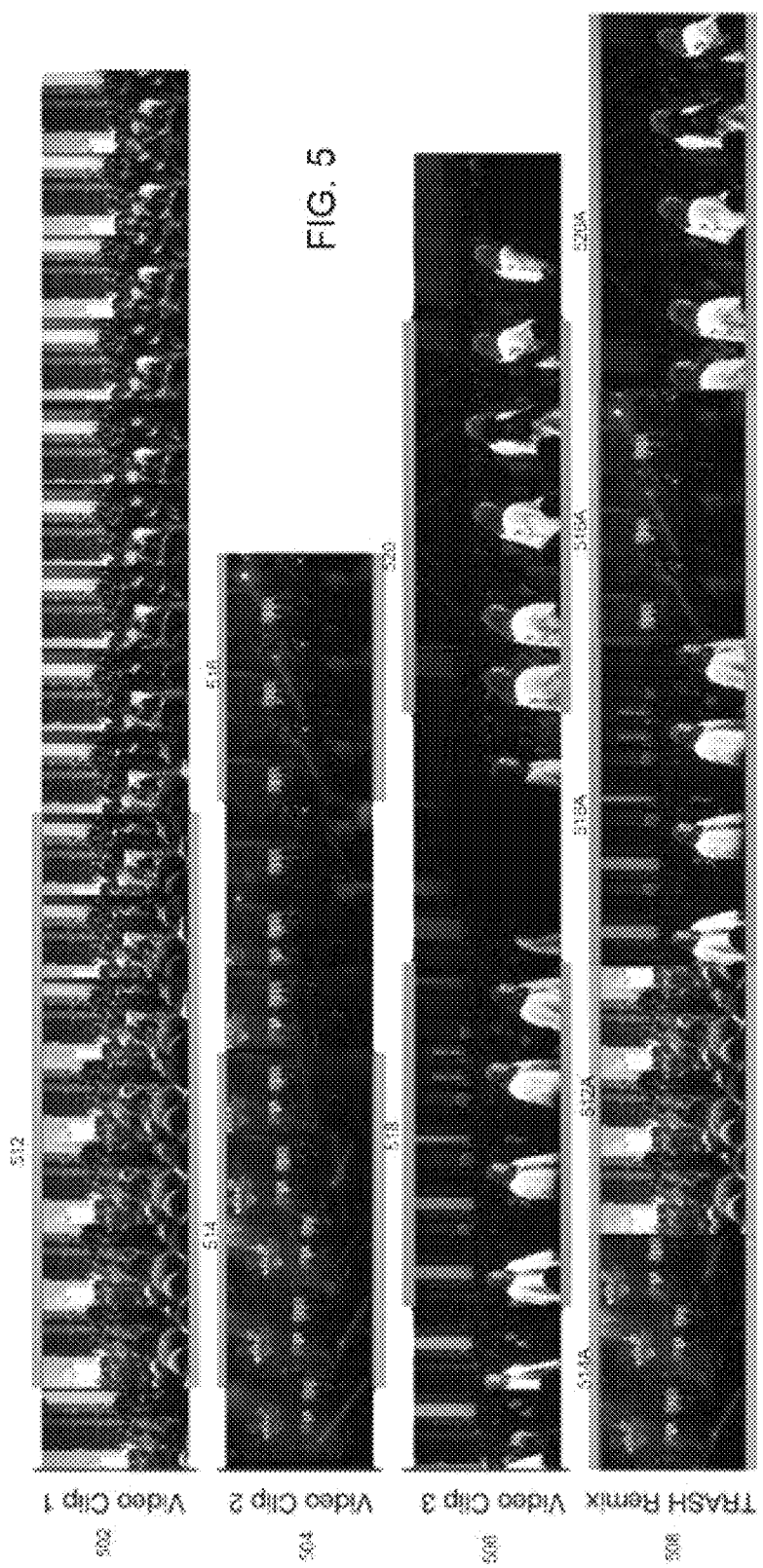
FIG. 5 is an example editing output produced according to one embodiment.

FIG. 5 shows an example of three video clips shot at a fashion show. Clip 1 502 shows a view of the audience, clip 2 504 shows a view of the chandelier lighting the venue, and clip 3 506 shows one of the models walking down the catwalk. The highlighted sections of each clip were automatically identified as interesting or important sections (e.g., Clip 1 at 512, clip 2 at 514 and 516, and clip 3 at 518 and 520) by the system's computer vision algorithms and/or classifiers. The final remixed clip 508 was arranged from processing the identified clips (e.g., the system generates trimmed clip segments 514A, 512A, 518A, 516A, and 520A) and selecting an ordering of the trimmed clips to present video with narrative progression (e.g., sequencing 514A, 512A, 518A, 516A, and 520A).

Various embodiments of the system employ a taxonomical representation of consumer video that goes beyond conventional everyday categories (e.g., object identification in video) made available in conventional approaches. For example, the processing system matches on dozens of film-specific concepts that are relevant to understanding video for editing purposes (e.g., spatial classification, temporal event identification, and contextual identification, among other options). Additional fine-grained cinematic concepts are also employed to process user video and edit the same.

According to some embodiments, the analysis and processing produce by the system can be tailored based on a user's task. For example, the models for processing and editing can be selected as particularly relevant to video on social media and/or professional editing tasks, etc. Such selection can provide a wider variety of semantic concepts relevant to understanding human emotion and reaction to film in the context of each task and/or broadly within any editing/processing approach. Further, given tasks social, professional editing, etc. can each have focused sets of sematic concepts that are more relevant given the context of a specific task. In some embodiments, the processing system can infer a user task based on video being input, naming convention for the input video and/or output video, as well as request user input on a given task and/or task category.

Further development of the machine learning models can be accomplished through use of the system and publication platform. For example, any video supplied and/or edited by users can provide a larger and more diverse taxonomy of significant concepts and provide further support for a large dataset of video examples for all items in the taxonomy. Additional data can be used to refine a numerical embedding space employed by the system. For example, based on the embedding space, the system can search for and select similar cinematic items (e.g., similar clips, similar video segments, etc.). In various embodiments, the processing system establishes an intelligent architecture including convolutional neural networks and other neural networks configured to match cinematic, cultural, emotional, and other concepts in source video, and employs the matches to edit, identify similarity, interleave clips, and/or build a group of clips having a target narrative goal and/or narrative progression. In further embodiments, the system incorporates temporal event localization within user source video to facilitate narrative construction. For example, the machine learning algorithms can identify important segments in user video, and ensure the video is either edited or expanded to capture the entire event defined by an event localization analysis. Various embodiments provide ground-breaking functionality to automatically edit together raw user footage to create a comprehensible story-like progression of video cuts that communicates the experience or intended narrative of a creator to their audience.

Figure 6:
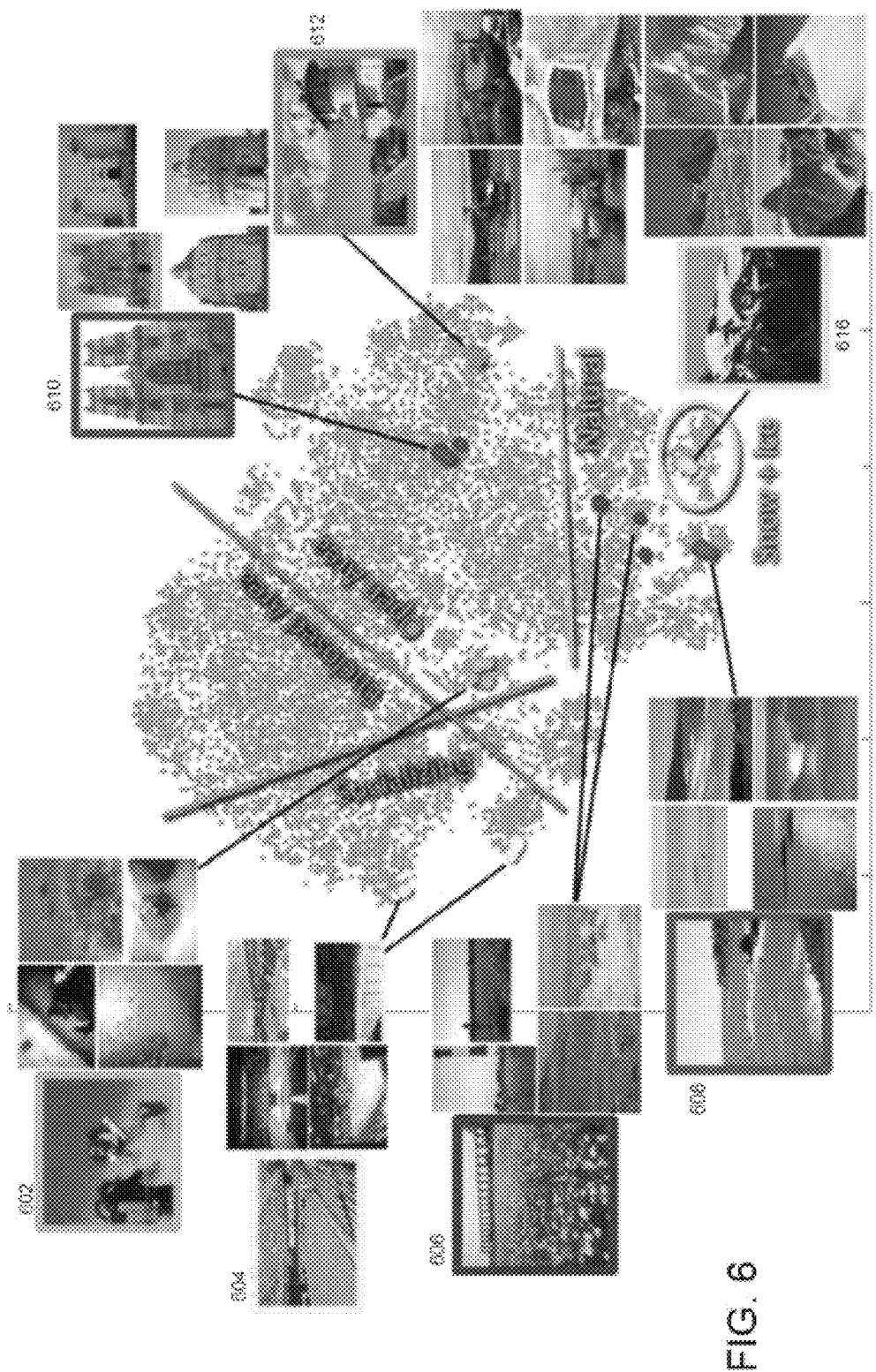
FIG. 6 is an example semantic embedding space, according to one embodiment.

FIG. 6 illustrates a rich semantic embedding space generated by various embodiments for matching by contextual content. In some embodiments, the system is configured to summarize video content and retrieves relevant videos from a video dataset using a semantic embedding space that contains object, person, and scene attributes as well as scene and object categories Shown in FIG. 6, the groups of images in that figure are groups of nearest neighbors in the semantic embedding space. For example, the images surrounded by a color boarder (e.g., 602, 604, 606, 608, 610, 612, 614, etc.) are examples of stills that could come from user video. Their semantic nearest neighbors are found in the semantic embedding space, which includes models trained to co-locate images with similar semantic content. For most of the example images (underwater open ocean, abbey, coastline, ice skating rink, heather, bistro, office) none of the nearest neighbor still images fall in the same dictionary definition category used by conventional definitions. Thus, the semantic embedding space allows for retrieval of relevant images/video that would not have been matched if a pre-trained scene category network feature space from conventional systems was used as the search space.

Figure 7:
FIG. 7 illustrates examples of descriptive semantic dimensions, according to one embodiment.

FIG. 7 illustrates examples of the descriptive semantic dimensions the processing system can predict about people and things from source video using artificial intelligence. In various embodiments, the semantic attributes predicted for the frames shown in FIG. 7, are then used by the system to dynamically select frames and/or video segments that match the mood and context of the input user video. In further embodiments, the system can incorporate categories identified by users for understanding images and video, even on different media delivery platforms.

Figure 8:
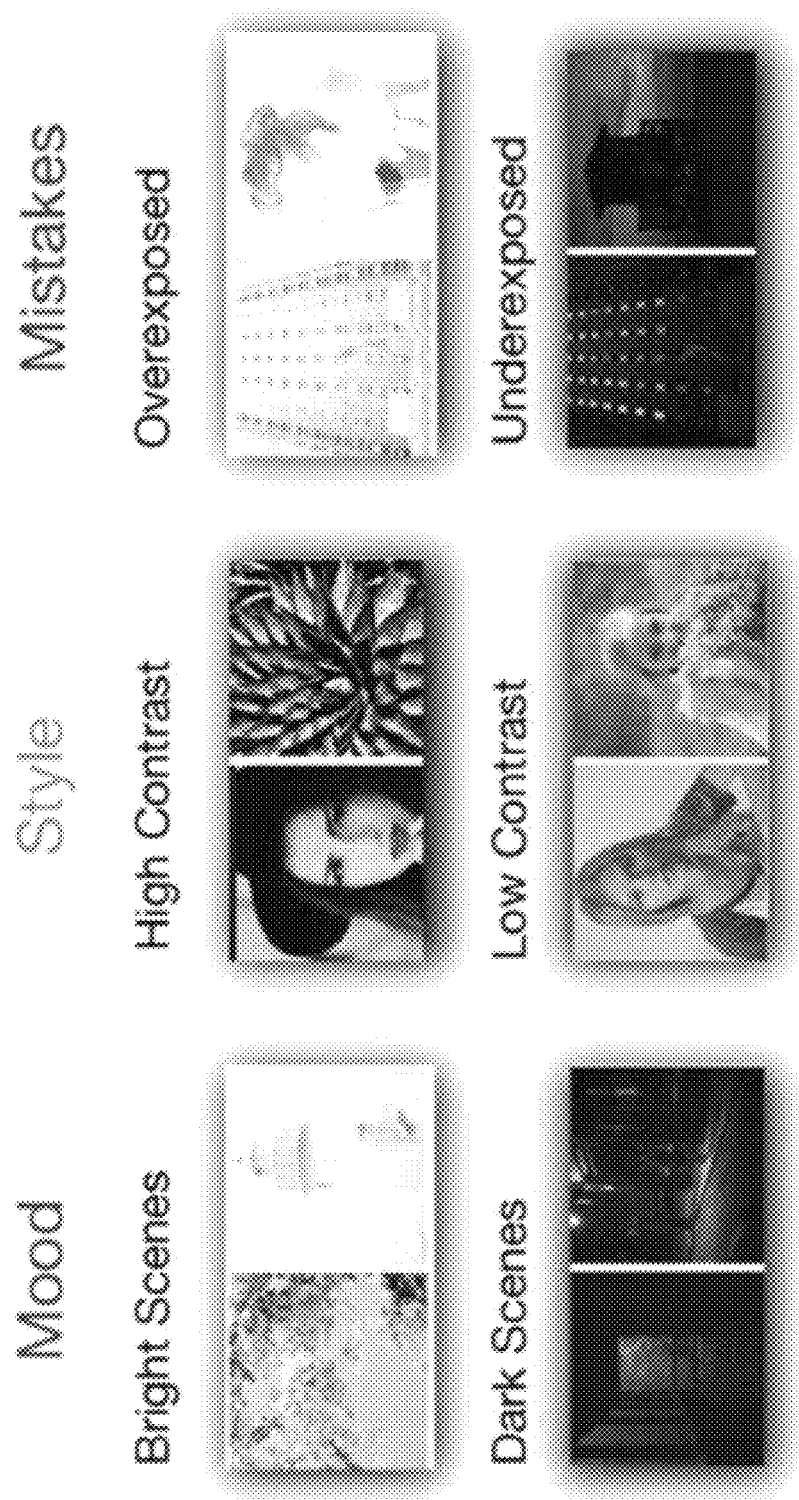
FIG. 8 illustrates example categories that can be classified by intelligent algorithms, according to one embodiment.

FIG. 8 illustrates example categories identified by test users that can be classified by intelligent algorithms executed on the system. In the example, the mood classifiers can then be used to identify similar scenes, which can be express by proximity in the embedding space, and such similar used to select scenes to incorporate, keep together, merge, etc. during editing of user source video. Some embodiments can build categories for use in classification based on analogy to still image decomposition, and others are defined to incorporate scene layout in conjunction with object or attribute presence.

FIG. 9 illustrates an example of layout recognition executed by the system. In the illustrated example, the processing system can distinguish over the shoulder camera angle in conjunction with other attributes. An 'over-the-shoulder' shot is a typical cinematic scene layout and a dimension of the semantic embedding space. Conventional classifier simply fail to address this distinction as the difference between a scene layout that matches this category and one that doesn't can be very subtle and depends strongly on multiple points of reference in a scene. In further embodiments, tuning of various neural networks and/or use of different architectures can be executed to confirm and/or improve accuracy in classification and use editing video.

Additional cues can be implemented on the system to facilitate automatic narrative construction. For example, a filmmaking goal of a semantic feature representation can include the ability of the intelligent models to tell "A-roll" video from "B-roll" video. "A-roll includes content that contains important subjects, like people, animals, or exciting events, and is generally user supplied content. "B-roll" includes supporting footage that can be intercut between A-roll to create mood and feeling that supports a story told in the A-roll. Various embodiments include classifiers configure to successful identify A-roll and B-roll in the semantic embedding space. FIG. 10 illustrates example stills identified by various machine learning approaches, that can generate multi-label dataset of semantic labels that also contains A-roll vs. B-roll labels.

Example Narrative Generation Network

Figure 11:
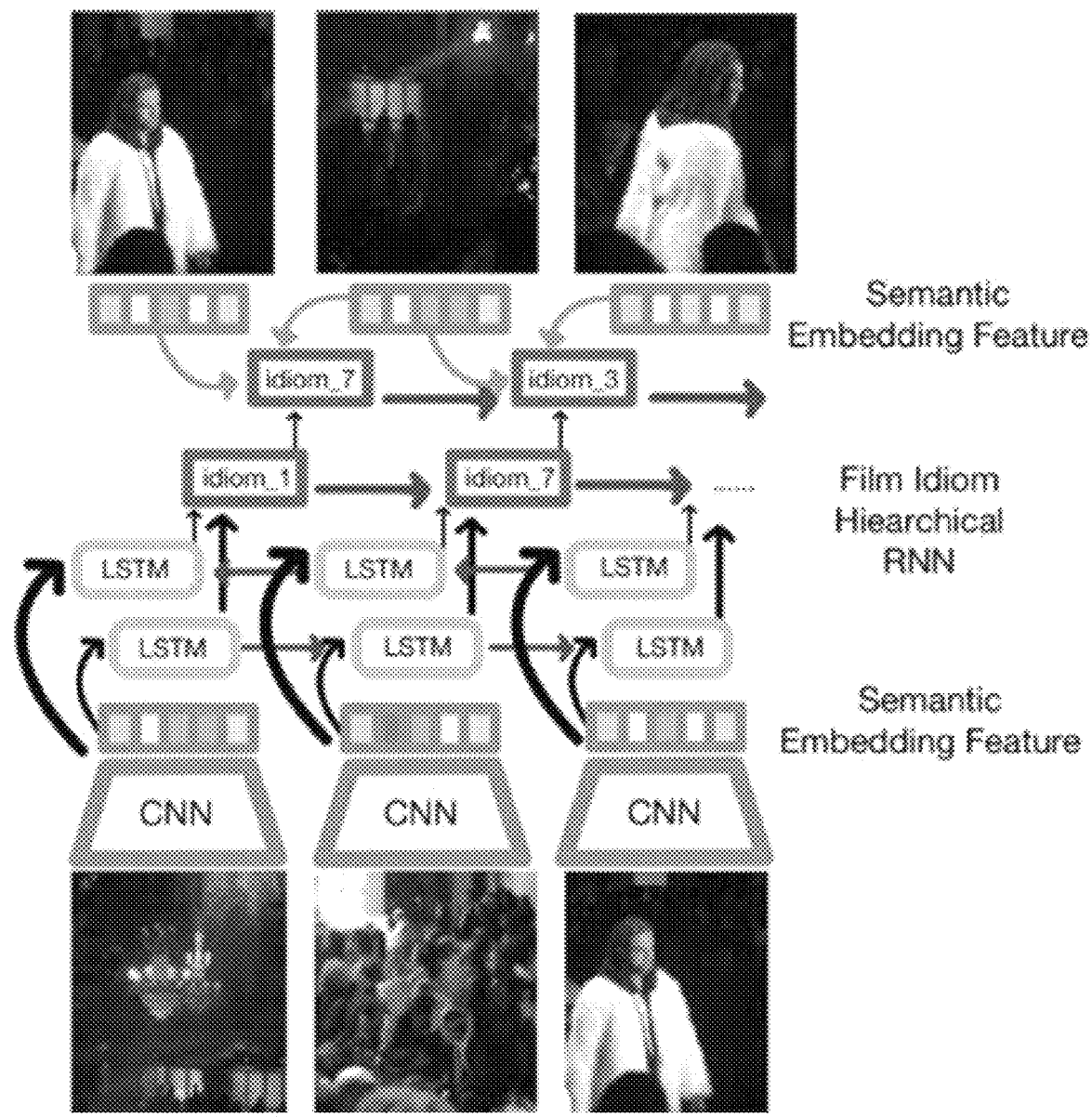
FIG. 11 is a high-level overview of a multi-stage film idiom recognition and generation network, according to one embodiment.

FIG. 11 illustrates an example analysis and architecture executed by the system to facilitate generation of a narrative sequence of video. In the example, training frames are generated by an expert from source video (e.g., from the video clips in FIG. 5, including a re-ordering of video frames). According to one embodiment, a CNN (convolutional neural network) accepts the training frames to extract the semantic embedding space features. The values from the embedding space are then fed into a bi-directional long-short term memory ("LSTM") recurrent neural network ("RNN") to determine film idiom. In various embodiments, the LTSM network can be configured to predict high probability transitions from film idiom to film idiom forward in time, e.g. idiom #7 or idiom #3. Shown in FIG. 11, the output frames are one frame further forward in time in the remixed training sequence of the frames that were input to the embedding hierarchical RNN. According to various embodiments, an example goal for this network is to predict reasonable sequences of film idioms and retrieve appropriate video content to complete the predicted idioms. As shown, the semantic feature and temporal feature extraction of the output frames at the top of the figure is summarized by grey arrows for space.

In further embodiment, CNN architectures are implemented for activity recognition in video, and in addition or alternative RNNs that take as input CNN features and are trained to identify activity recognition. Residual connections, popular for making can also be used in yet other embodiments to train extremely deep CNNs for activity recognition. Some other approaches include 3D CNNs that train spatial and temporal 3D filters and dynamic image networks that extract a rank pooled 2D representation of video clips that can then be input to a traditional CNN for activity recognition. As discussed, various embodiments can employ multiple machine learning algorithms to process video and generate a narrative within an edited sequence.

In addition to trimming video to contain that which is most relevant, computational editing in the style of TV and film has also been implemented to yield narrative sequences, for example based on recognition and generation of film idioms, segments of video clips that form attractive transitions in longer sequences such as (long, medium, close-up shot) or (over-the-shoulder with subject #1, over-the-shoulder with subject #2). Variety of transitions and/or temporal events can be linked, and output by machine learning models trained on various narrative progression in both television and film sequence. In some example, expert editor can label and identify narrative progression sequence, and/or film idioms that can be linked or sequenced. Machine learning algorithms can be trained on the labeled data to generate narrative sequence and/or segments linkages within user supplied video and/or interleave video content.

Various embodiments, are configured to meet the needs of casual and professional users, with a computational editing pipeline that extracts relevant semantic concepts from static frames and video clips, recombines clips into film idioms that form the grammar of cinematic editing, and interact with users to collaboratively create engaging short films. FIG. 11 illustrates a high-level overview of a multi-stage film idiom recognition and generation network. As discussed above, various implementations are tailored to execute even in the context of a mobile device platform with associated computation and power limitations. In some embodiment, first network (e.g., a CNN) can be used to identify important video segments and project them into a semantic embedding space. The semantic embedding space can be used to identify concepts, film idiom, cinematic categories, etc. The identification can be executed by another neural network (e.g., LTSM) and/or by the first network. The identification of concepts, film idiom, cinematic categories, etc., can also identify options narrative progression, and the best candidates for such narrative, for example, using a LTSM network. Based on the identification of a "best" narrative sequence an output video can be presented to end users. Based on any further edits, additional feedback can be created to refine the machine learning implementation.

Example Processing Implementation

According to various embodiments, the processing system can include visual concept classifiers, temporal attention networks, and video sequence generators, to accept, process, and edit user source video. For example, the visual concept classifiers can be configured to automatically and accurately detect objects, attributes, scenes, genres, and/or cinematic styles. More specifically, the classifiers were developed to be computationally efficient enough to run directly on a mobile platform. In further embodiments, a temporal attention network algorithm can be configured to automatically detect highlights/important events within a sample video clip, and a video sequence generator algorithm can be configured to build narratives from different sets of video clips. Additional AI tools can be incorporated into the processing system including machine learning algorithms configured to generate augmented reality, dialog editing, and dynamic music matching, among other options.

As discussed above, various embodiments can tailor editing functionality based on a task the user wishes to accomplish in editing video. Additional embodiments can be configured to enable users to select task based functionality and/or functionality suits can be determined by the system based on broad user persona and associated editing needs. According to some embodiments, example personas and associated functionality modules can include:

an entertainment module configured to serve users who are recording video at sporting events, concerts, and other live events and wish to post videos instantly while they are experiencing the event or quickly summarize content from a multiple day experience into a congruent video narrative. For example, the types of inputs expected from users in this persona include short clips from concerts, sporting events, shot on phone. Example feature sets can include location (geo) tagging, original audio, more creative treatments to share the feeling of the event.

professional networking module configured to serve a few different types of professional users. For example, this group includes "influencers" (people with a large number of followers (e.g., more than 40 k followers on Instagram) that produce content professionally for their audiences and are paid by brands to do so). Another group includes professionals who work with the public (e.g., leaders, creatives, freelancers, etc.) who want to further their professional influence in circles they network with (including businesses and marketing events) such as posting videos to LinkedIn. In some examples, the type of video input will include mobile or professionally shot video clips from influencers and professionals promoting their careers. Example features include original audio, dialog-based editing, audio ducking.

personal connections module configured to focus on user personas who want to stay in touch with family and friends through video sharing. Example input includes short clips shot on phone. Example features include dialog-based editing, grouping camera roll by event (i.e. child's birthday), text overlay, send to group option/send privately option.

education module configured to target teachers and educators who want to engage children and students with novel learning tools through video creation. Children are beginning to learn at an early age not just how to consume video content but also to create it. Various examples can be used for education both in terms of consuming short form educational content for children and adults as well as offering teens and adults a participatory medium for learning the art of video creation, a key medium to learn to communicate in now. Example inputs include longer clips shot on a camera or phone of lectures, classes. Example features for this persona include original audio, dialog-based editing, audio ducking, captions, split screen, and upload of supplemental materials.

accessibility module configured to assist individuals with disabilities or underserved populations that require additional workflow assistance to create videos with TRASH compared to other to user markets. Although multiple user groups are served by these modules, various embodiments are tailor to serve two main user populations, people with disabilities and the elderly. Individuals with disabilities who may struggle to use desktop tools or video cameras because of motor or visual impairments, may be able to use the system in an accessibility mode on their phone with hands-free tools or high contrast/large text UI. In another example, elderly users represent a persona who might be intimidated by the degree of technical proficiency required to use desktop video editing tools but could master simple phone taps with optional accessibility features. The types of inputs include short clips shot on a phone in accessibility mode, and features can include dialog-based editing, creating treatments (to create a mood with one tap), among other options.

In further embodiments, the processing system and/or publication component can include links or APIs to integrate external social media platforms. In some examples, the user interfaces displayed can be tailored to specific social media platform.

Figure 12:
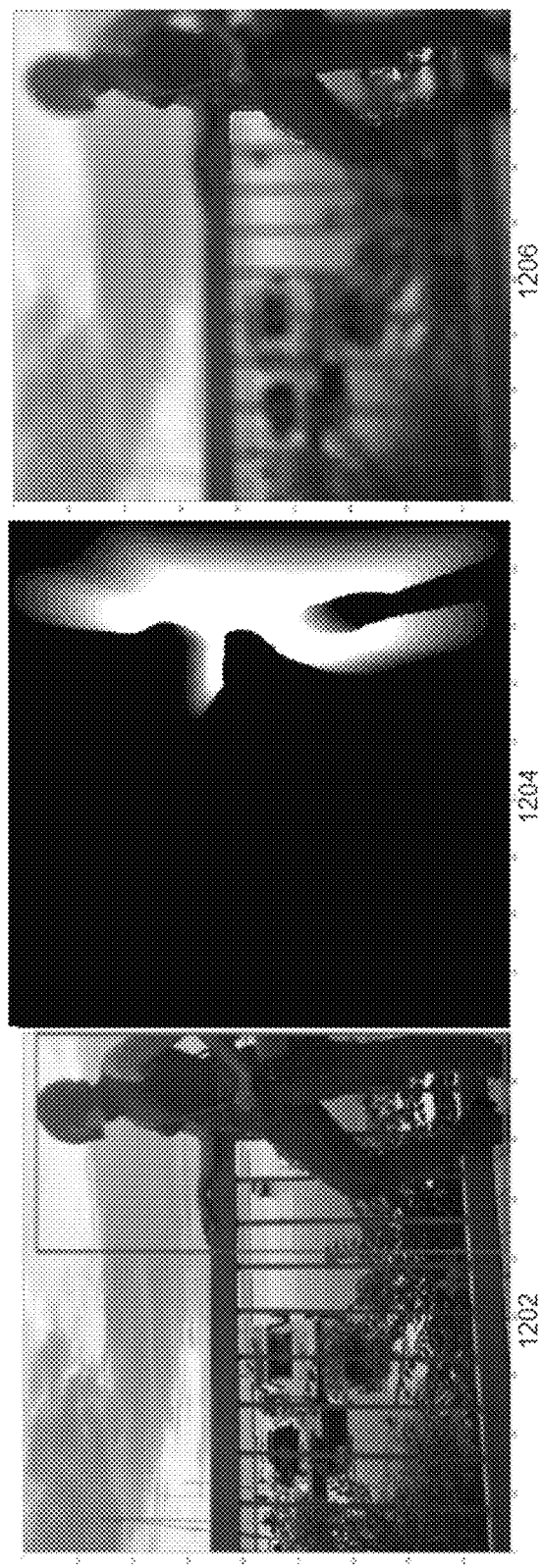
FIG. 12 illustrates automatic AR effects generate by the system, according to one embodiment.

In further embodiments, the processing system can include AR effects that can be automatically introduced into video segment and/or be generated responsive to selection in the UI. In some embodiments, AR effects are based at least in part on techniques from computer vision such as facial recognition and object segmentation. In some examples, the application creates AR effects automatically that reproduce popular analog cinematography techniques such as focusing and defocusing effects shown in FIG. 12. In the example, the left image 1202 shows the original input image, with the segmentation model bounding box. The center image 1204 shows the alpha map constructed using the segmentation model's output mask, where the algorithm has approximated alpha blending by iteratively shrinking the mask and varying the alpha value from 0 to 1. The right image 1206 shows the result from generating a version of the image using Gaussian blurring, then using the constructed alpha mask to blend the blurred image with the original image, producing a shallow depth of field effect.

Figure 13:
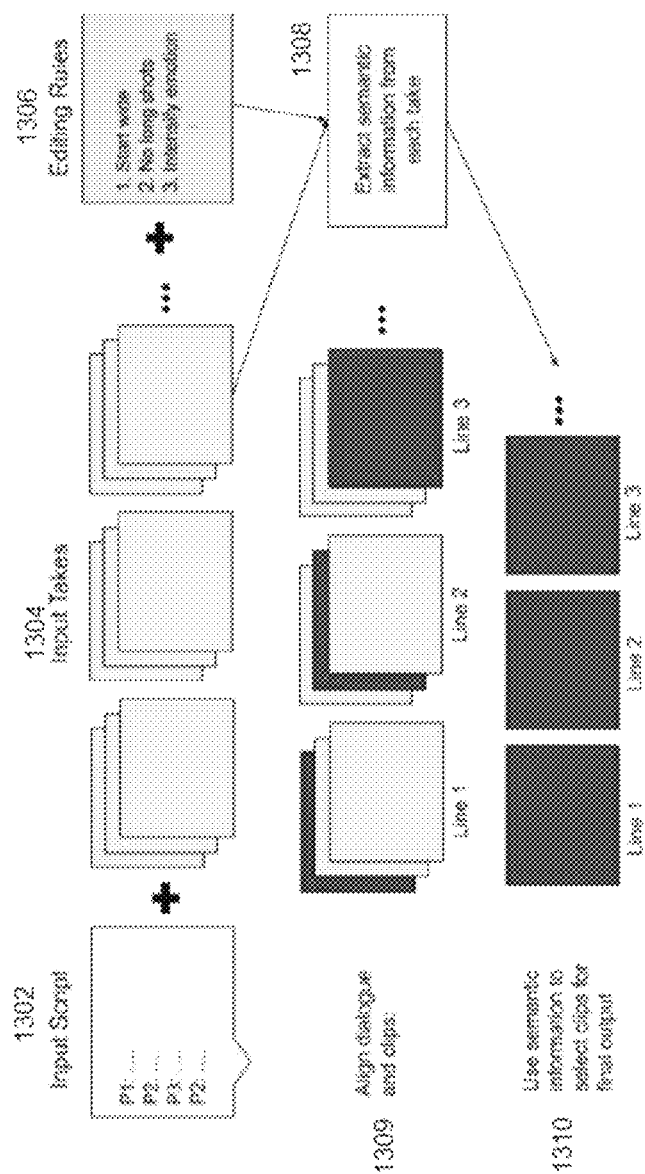
FIG. 13 illustrate an example process and element for dialog-based editing, according to one embodiment.

Additional functions provided by the system include dialog-based editing. In some embodiments, processing system can take as an input a script with line of dialog (e.g., 1302), a set of input takes (e.g., 1304 video clips), and a set of editing rules (e.g., 1306 "start wide," no "long" shots, and intensify emotion, among other option), to generate a final video output 1310. Given the inputs, the processing system can align dialog and clips by extracting and matching concepts (e.g., matching semantic information associated with clips (e.g., as discussed above), and then employing the semantic information to order and/or select specific clips for an output video, for example, as shown in FIG. 13.

Figure 14:
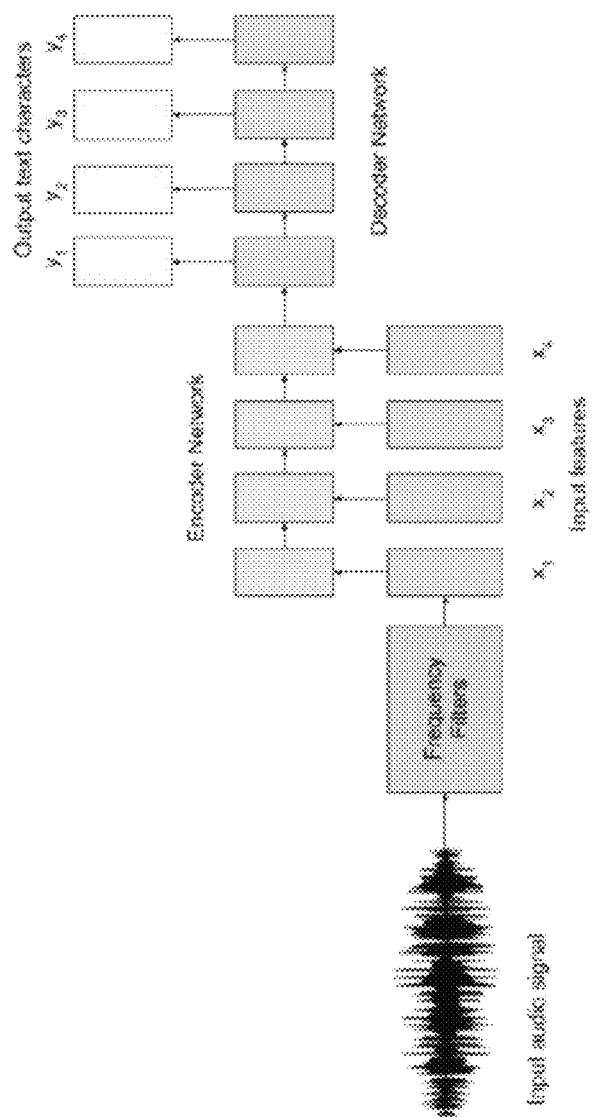
FIG. 14 is an example encoder-decoder model configured to process an audio signal, according to one embodiment.

Shown in FIG. 14 is an encoder-decoder model configured to process an audio signal (e.g., from user source video) to produce text as output (e.g., dialog). According to some embodiments, the system is configured to generate a script based at least in part on natural language processing algorithms for conversation and narrative text generation.

In various examples, the system can be configured to automatically create output videos of approximately 30 to 60 seconds in length in 2 to 3 minutes of computation time on a mobile device. Conventional approaches would typically require a human editor approximately 1 hour to complete the same task. Additionally, the inventors are unaware of a conventional editing system that can provide the same functionality without a human editor.

Figure 15:
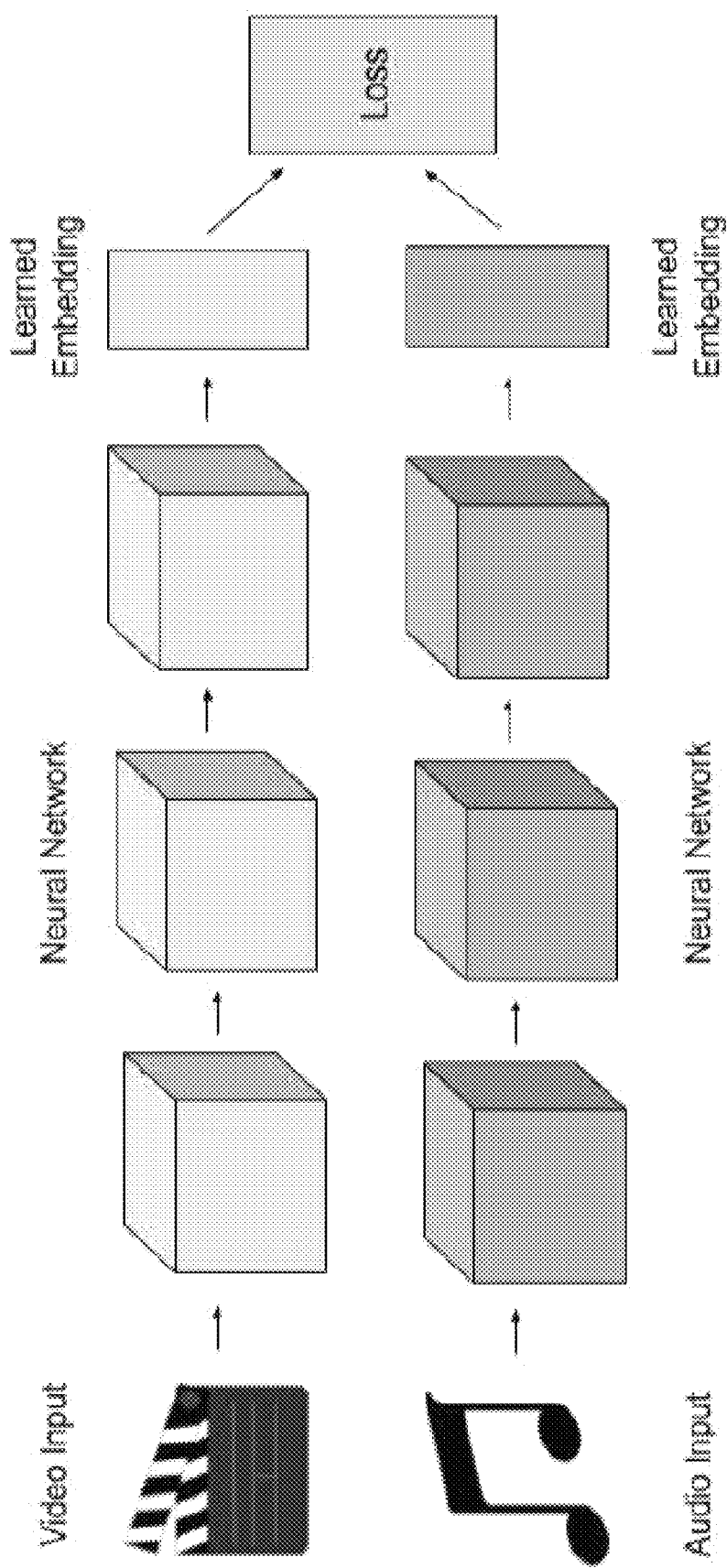
FIG. 15 is an example dynamic music matching network, according to one embodiment.

In addition to the video editing tasks, various embodiments of the system include neural networks configured to automatically match soundtracks to generated video and introduce the soundtracks into the output video. In other examples, matching songs as well as recommendation for timing of the matching songs can be generated and displayed to users to select in a user interface. In one example, the neural network is based on a convolutional neural network (CNN) architecture. Several networks can be trained an internal video dataset labeled with ontology categories configured to identify music, soundtracks, etc. that further construction of a narrative in output video. In one example, the CNNs enable projection of user videos into a discrete embedding space, which in turn provides the digital features for an editing network to create an output sequence. Various embodiments. project songs the semantic embedding space, enabling the system to automatically recommend a relevant soundtrack based on the input video's visual content (see e.g., FIG. 15). FIG. 15 illustrates a dynamic music matching network trained over video and audio inputs to learn a joint embedding space such that the difference between the learned embeddings are more similar when audio and video come from the same input, and less similar when from differing sources.

Content Database and Clip Exchange

According to some embodiments, the system can include a service to enable the described editing task through online sources as well as application-based approaches. In further embodiments, user content can be exchange, created, and/or made accessible through a payment gateway using the services and/or application. In one example, users share clips with each other through "sampling" them on the system. In another example, user can access a marketplace whereby users can purchase clips of video (e.g., b-roll, a cutaway shot, an aerial shot, etc.) to enhance the video they are creating. In some examples, user can upload additional content (e.g., in addition to what they are able to record with their phones) and make it available for purchase. In further embodiment, the system can include machine learning capabilities configured to recommend relevant content for users to sample (e.g., an automatic "sampler"). As part of this functionality, the system can be configured to "seed" the clip sharing exchange with content partners such as the Internet Archive and GIPHY using their APIs.

Stated broadly, various embodiments include implementation of at least one and/or various combinations of the following: several artificial intelligence algorithms configured to simplify and automate digital video editing on mobile devices. For example, the system is configured to target simplifying video editing to the point where any user can shoot, edit, and share professional looking short videos from their phones. In further example, mobile video editing lowers the barrier to entry for videography, empowering a new generation of video creators. The inventors have realized that scaling and maximizing accessibility of high-quality video production via smart phone and related devices has significant implications for video editing adoption, and, as video content rapidly expands, can help level the playing field for underserved users groups who are reluctant to try due to lack of experience or expertise.

Various embodiments of the application (e.g., FIGS. 1, 3A, 3B, and 3C) allow users to both edit together videos captured with a mobile device (e.g., iPhone) and share video creations with others. The general workflow includes users selecting input clips from the videos stored in their phone's camera roll (e.g., FIG. 3A). The application is configured to automatically generate a video clip, which can be integrated with automated sound selections and/or editing. In one example, the video is created and is set to a soundtrack from the processing system music library. In further embodiments, the application can include a director's view (e.g., FIG. 3C) which allows users to change several aspects of the automatically created rough cut video and/or soundtrack.

According to one embodiment, the application is configured to accept user input (e.g., via UI FIG. 3C) to change the suggested soundtrack (sound), pace of edit cuts (speed), or the color grading and visual effects applied to the output video (vibe). In further example, users can also remix the video and trigger the system to generate a new auto-generated rough cut or add new footage. Once the user is satisfied with their creation, they can continue to the share view (e.g., FIG. 3B (right)), where they can upload their video to their user profile and save their new creation to their own camera roll. In various embodiments, the application is configured to accept user designated video (e.g., from a camera roll) and input the video into a pretrained object recognition convolutional neural network (CNN) which is configured to output the rough cut video automatically.

Visual Concept Category Selection Examples

According to further embodiments, the application/system can include a large suite of visual concepts that the processing system/application is configured to automatically detect for accurate video editing. In one example, defined is a visual concept category that refers to a specific item within a plurality of different visual concept category groups. In one example, five groups were used to focus defining/training of the neural network. Other groupings and numbers of groups can be used in different embodiments. According to one embodiment, example groups and example visual concept categories within each group include at least one, and/or any combination of the following visual concept categories:

Objects: This group of concept categories included items such as "dog, cat, car, bicycle, food, etc."

Attributes: This group of concept categories included items such as "happy, furry, sad, sporty, etc."

Scenes: This group of concept categories included items such as "raining, natural, urban, etc."

Genres: This group of concept categories included items such as "romantic, minimal, horror, etc."

Cinematic Style: This group of concept categories included 15 items "close-up, wide shot, medium shot, full shot, symmetry, geometric, shallow depth of field, deep depth of field, cool tones, warm tones, pastels, dark mood, selfie, posing person, laughing/smiling, blurry."

Example Classifier Training

Figure 17:
FIG. 17 is an example user interface, according to one embodiment.

In one example, an active learning system (dubbed Oscar) enabled annotators to bootstrap classifiers for at least ninetythree concept categories from our unlabeled user video repository. In one example, Oscar was adapted for video from earlier active learning systems for low-shot image classification. According to various embodiments, active learning is a process that starts with one positive training example and an unlabeled dataset. In one example, a weak classifier is iteratively improved by an oracle, in this case a video expert, who corrects the classifications of the weak classifier and after several iterations builds up a strong classifier. The available unlabeled dataset contained over 200,000 images from ~20,000 video clips uploaded by users. In one implementation, supervised learning techniques were executed to start classifiers by uploading a few positive examples to an Oscar webservice implementation. Oscar then presented the experts with several iterations of the questions (e.g., FIG. 17—"select correct examples of images featuring symmetry" at 1702, "examples of images not featuring symmetry" at 1704, "select which images fit the correct example image set" at 1706, and "positive predictions of images featuring symmetry" at 1708) to build strong classifiers. Training for each category can be supervised until sufficient accuracy is achieved. FIG. 17 shows an example video classifier bootstrapping UI is annotator UI for capturing responses to active queries in an active learning tool. In this Figure, the annotator is creating a classifier for the concept symmetry.

Figure 18:
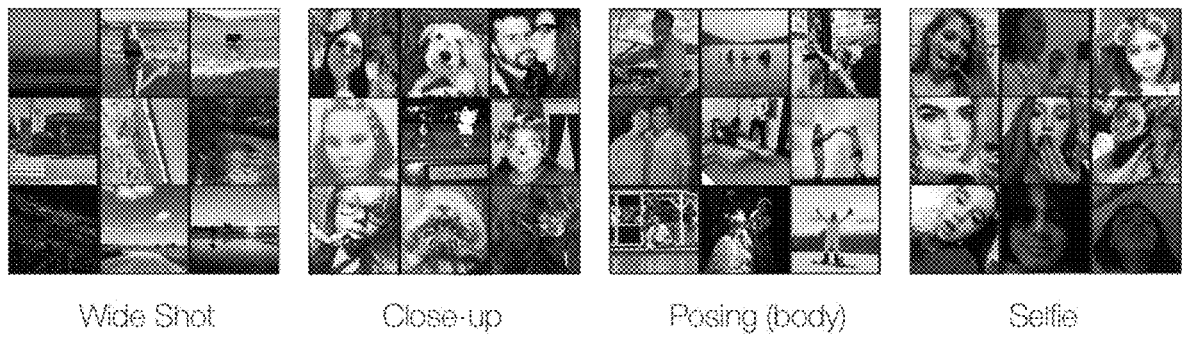
FIG. 18 illustrates example classifications for user video, according to one embodiment.

In some examples, classifiers were evaluated on a held-out test set by a film editor expert. A classifier passed quality assurance if between 90-100% of the most confident detections in the test set were of the correct category. This threshold can vary based on rarity of positive examples in the test set. FIG. 18 shows the top detections on a held-out test set of four of our active learning bootstrapped classifiers for several of the cinematic style visual concept group. FIG. 18 illustrates example results of successfully bootstrapped video classifiers executed on an unlabeled test set. These are sample detections of the concepts listed above in the cinematic group discovered in an unlabeled test set of user videos.

Further embodiments were used to create a fully annotated internal dataset by running our bootstrapped classifiers on all unlabeled images in the dataset. For example, the cinematic style concept dataset included a 15-dimensional multiclass label vector for all 200 k+ user submitted video frame images. Further implementations used the dataset of video/image along with four available research video/image datasets to create/tune high-performance CNNs for each visual concept category ontology group. In some embodiments, the system executed a single classification task for the set of labels defined by that dataset (e.g., using a single task classifier network), and one computationally efficient CNN that performed all classification tasks across all five ontology groups and rendered a ninety three-dimensional classification label vector at inference time (e.g., a multi-task classifier network). In an iOS app's editing pipeline, this dimensional label vector informs editing decisions used to create rough cut and/or sound integration automatically.

Further embodiments refined the trained CNNs implementation to balance accurately recognizing visual concept categories, while minimizing computational overhead. In some embodiments, the system/application used two kinds of CNN architecture, the computationally efficient MobileNet v2 (MNv2) and the high performance wide ResNet Places CNN. In various operational environments, the MNv2 architecture was selected (e.g., even in a backend cloud service—because of the high computational cost of CNN classification over massive amounts of images and video), which can result in a requirement for GPU machine instances. With these architectures various embodiments trained a multi-task network for performing classification on mobile device architecture. In various examples, the multi-task network was implemented with a MNv2 backbone configured to feed the output of its last convolutional layer to five mini-CNNs, each fine-tuned to a different visual concept category group: Objects, Attributes, Scenes, Genres and Cinematic Style. According to one example, a "single group network" refers to a CNN that was trained only with data from that specific group, while the "multi-group network" (examples can be referred to as TrashNet) was trained using all data. Each architecture can be used in various implementations, and further performance metrics described below can be used to select between the architectures and/or to implement hybrid selections.

Table 1 describes performance metrics for the TrashNet and our single-group CNNs architectures for five different ontology groups. For example, Table 1 describes example executions using five ontology groups classified by Single Task and Multi-Task Classifier Networks rated against a baseline (e.g., a baseline for classification and not detection, which is the more common task for this dataset (Ronchi and Perona 2017)).

TABLE 1

| Ontology Group | Baseline Performance (mAP) | Single Task Classifier Network (mAP) | Multi-Task Classifier TrashNet Performance (mAP) |
| --- | --- | --- | --- |
| Objects | 0.86 | 0.75 | 0.43 |
| Top 1 Accuracy | | 97.10% | 95.50% |
| Attributes | 0.36 | 0.38 | 0.33 |
| Scenes | 0.93 | 0.93 | 0.58 |
| Genres | 0.37 | 0.62 | 0.35 |
| Top 5 Accuracy | | 87.51% | 81.60% |
| Cinematic Syles | N/A | 0.94 | 0.77 |

According to one example, performance is measured with two metrics often used in computer vision and machine learning: Average Precision (AP) and Top-1 or Top-5 Accuracy (Acc). Accuracy alone does not capture meaningful performance characteristics of multi-class retrieval and classification tasks, which motivates use of AP in describing performance. AP is computed by integrating the Precision/Recall (PR) curve, and falls between 0 (poor precision, regardless of recall), and 1 (high precision, regardless of recall). Precision and recall describe performance of information retrieval and prediction tasks. Precision is the ratio of correct or relevant results to total results, and recall is the ratio of correct or relevant results to total correct or relevant samples (also referred to as sensitivity). It is common to report the mean AP (mAP) across all classes (for classification) or several queries (retrieval). Because of the way that AP is calculated, models with high precision but low recall or high recall but low precision for a given classification threshold may have the same AP. Thus, AP is often used as a rough description of overall model performance. In practice, specific model parameters are selected to optimize for precision, recall, or a combination of the two—a tactic used in various embodiments and underlying model selection. For two of the four public dataset groups (Descriptors and Genre), fine-tuning a MNv2 on the group performed better than the published baseline (Table 1).

Various embodiments were implemented with classification thresholds to ensure that all TrashNet categories have high precision, but are likely to have low recall. In various examples, TrashNet was able to successfully classify videos across all ontology groups such as cinematic style.

In various embodiments, TrashNet is configured to categorize user videos on the client side (and mobile devices), but for high performance video retrieval in our video database service—the system includes next generation feature embedding space implementation. For example, embodiments employing the video embedding space enable a richer description of actions and activities in video that more closely resembles the linguistic model humans use to understand such actions. In one embodiment, by representing actions in video richly as Subject, Verb, Object (SVO) tuples, the system improves contextual retrieval performance as well as allows for variance in any of the three SVO dimensions, which enables quick exploration of the semantic action space. More intuitively, the system factorizes "person grooming dog" into "person grooming" and "dog being groomed," which is semantically and linguistically different from "dog grooming" and "person being groomed." FIG. 19 provides a visualization of how the SVO embedding space works.

Figure 19:
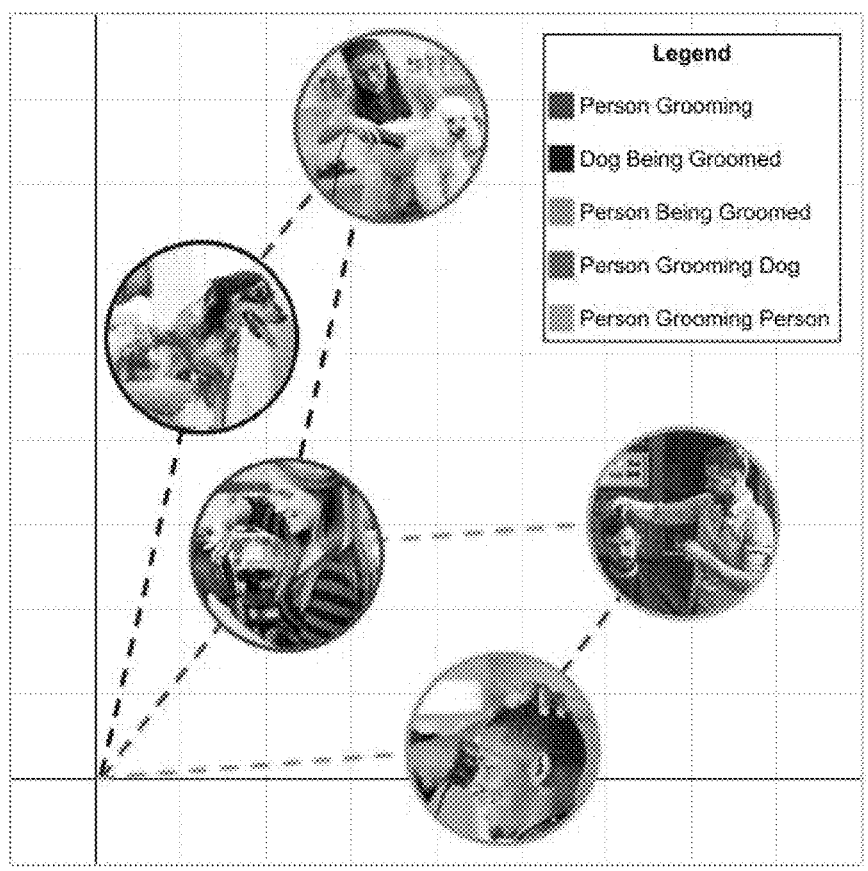
FIG. 19 illustrates example classifications, according to one embodiment.

Shown in FIG. 19 is an example of subject-object decomposition model. "Person grooming," "dog being groomed" and "person being groomed" are all results of either a SV composition or an OV composition. In various embodiments, by combining a SV vector like "person grooming" with an OV vector, the system produces a SVO embedding, such as "person grooming dog" (magenta) or "person grooming dog" (orange).

As a consequence of representing video in this way, a video of a person dunking a basketball can be cut (temporally aligned) with someone else dunking cookies in milk. In various embodiments, the system accomplishes this edit automatically by first inferring the SVO triplet by finding the nearest point in embeddings space and subsequently perturbing one (or more) of the three dimensions (subject, verb, object). For example, by combining spatial and temporal alignment, the system creates user interesting content in a much faster and easier method relative to any manual search, modifying search terms, editing and re-editing video. Ultimately, the result is an automated system that operates (video editing process) orders of magnitudes faster than conventional approaches, especially for tasks in which editors need to cut many actions together (sports highlights, music videos, etc.). Various embodiments further enable a marriage of linguistic and visual modeling that contributes to a growing body of work to improve general machine intelligence, including semantic scene representation and visual question answering.

Figure 20:
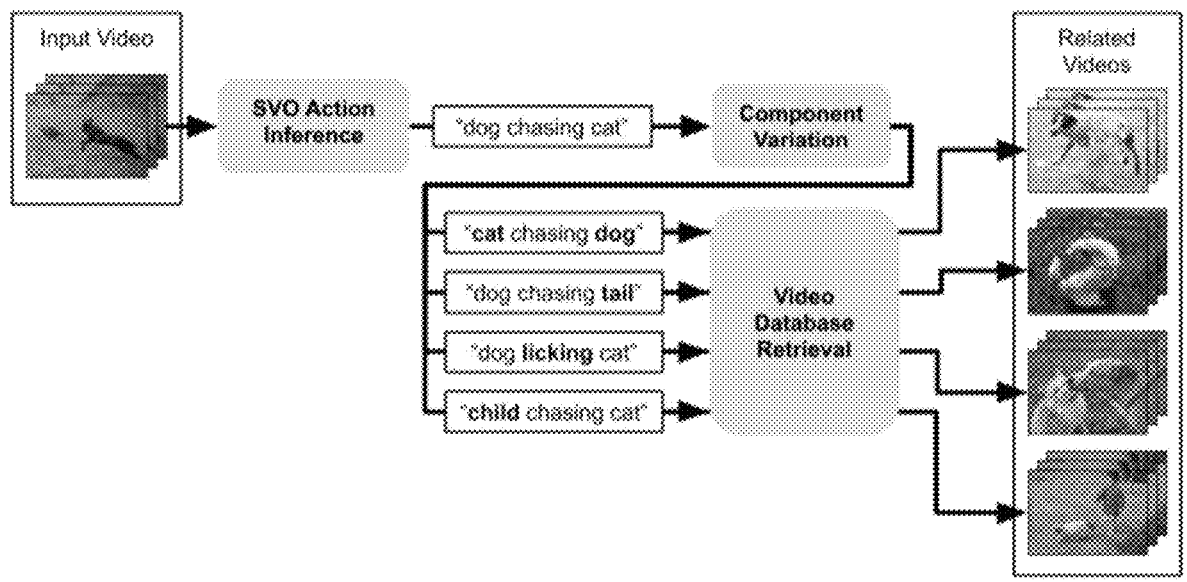
FIG. 20 is an example process flow, according to one embodiment.

FIG. 20 illustrates innovative video retrieval in the system. As shown, Input videos are passed into a module which infers a SVO action for that video. Varying the SVO action along one or more dimensions (e.g., subject, verb, and object), produces related actions, which can be used as queries to the system.

In one embodiment, the system models nouns and actions in the SVO triplet as two pairs:

$$(s, v^s) \text{ and } (o, v^o)$$

In further embodiments, the system models verbs as transformations on noun vectors, and the embeddings of these (noun, verb) pairs can be expressed as the following where i indicates a given image at inference time:

$$h(s_i, v_i, o_i) = v_i^s(s_i) + v_i^o(o_i)$$

In some embodiments, the system can train our network by calculating the "Glove" embeddings (e.g., 300-dimensional by default) of the subject and object nouns in our dataset. The system can then train a CNN network to embed visual representations of those subjects and objects to the correct location in Glove space. In one embodiment, the system uses a triplet loss formulation to learn to represent verbs as linear transformations of nouns:

$$v_i^x(x_i)$$

The system then trains the embedding CNN to minimize distance from training images to their SVO identities in the 300-dimensional embedding space.

Figure 21:
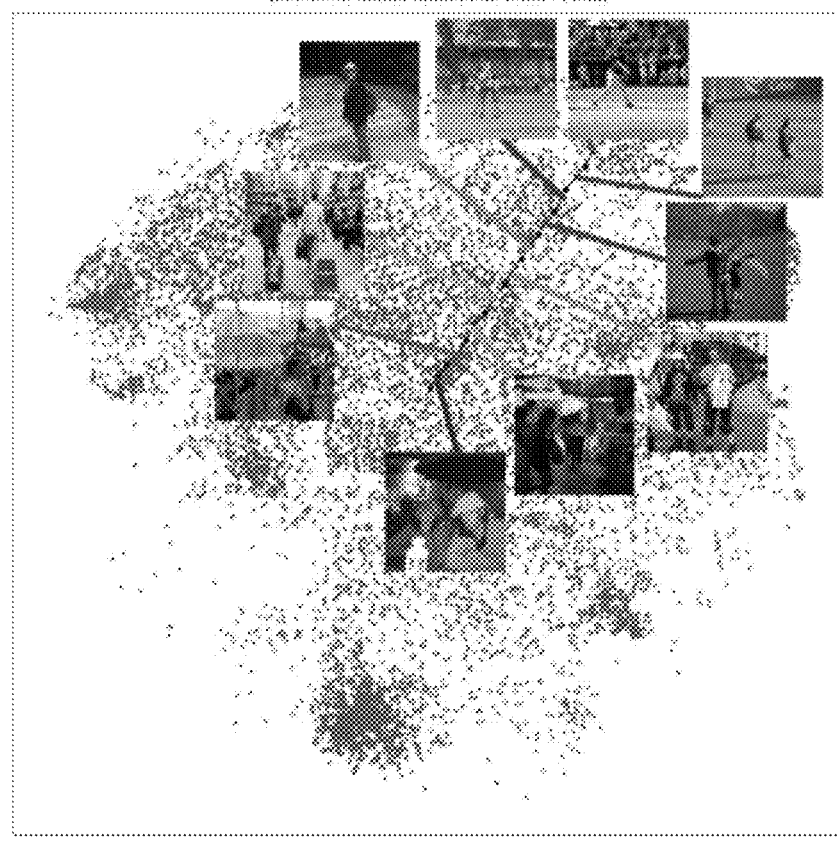
FIG. 21 is a diagram of validation data in an embedding space and images, according to one embodiment.
Figure 22:
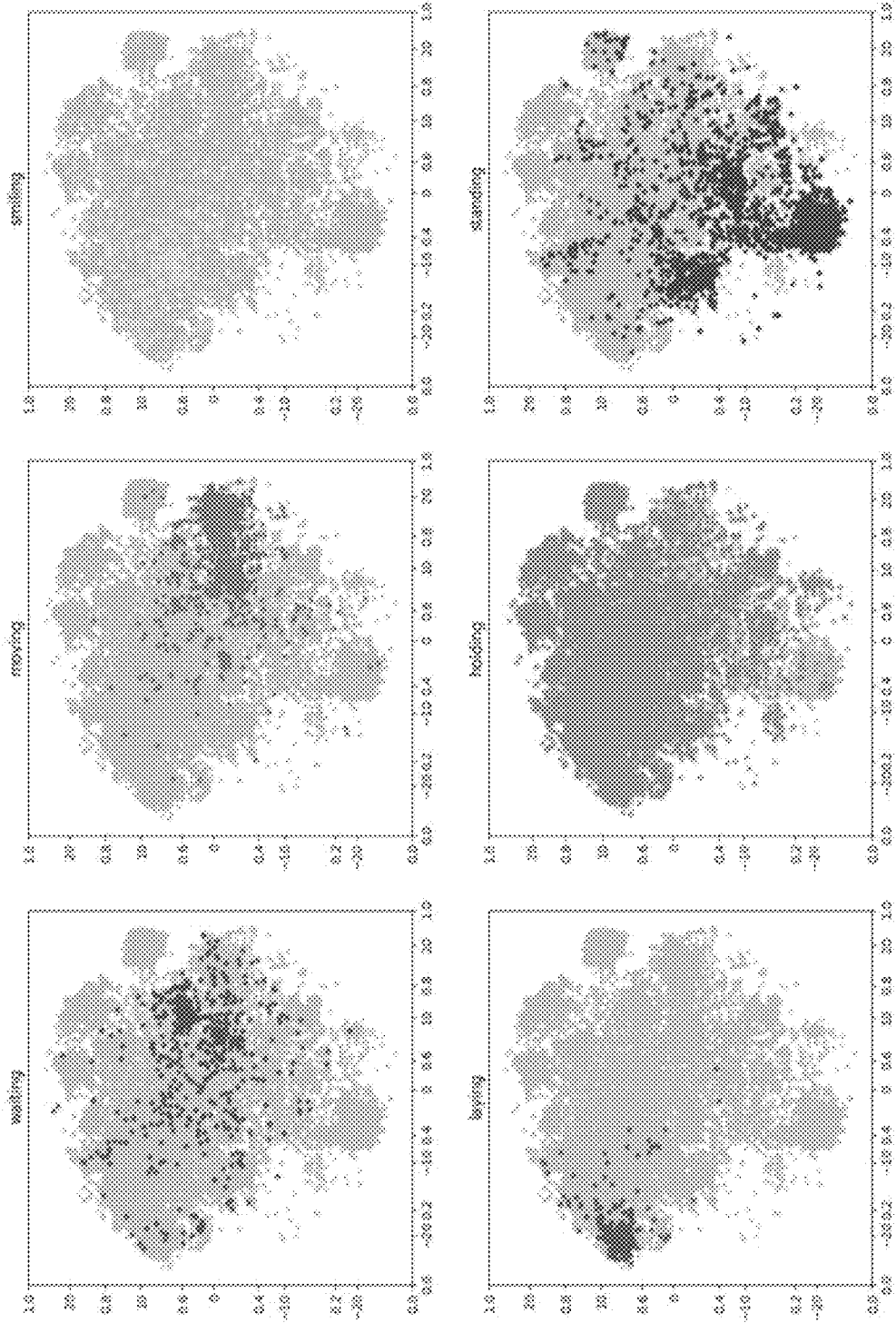
FIG. 22 is a diagram of graphs of validation data and classifications, according to one embodiment.

In various embodiments, the system is configured to search the embedding space and project an image into SVO embedding space using the CNN that was trained to fit the function h above, using the training set. FIG. 21 illustrates a SD visualization of the SVO validation dataset. The system can be configured to then estimate the SVO word triplet for a test image using nearest neighbors. To produce semantically adjacent actions, the system is configured to perturb one or more of the SVO dimensions and retrieve samples of these actions from our video database. FIG. 22 illustrates a 2D visualization of Subject, Verb, Object (SVO) validation dataset, created from the labels available in the COCO dataset (subjects and objects) and the COCO Attributes dataset (activities).

After training, test executions passed 17,000 unseen validation images through the network. Each validation image (dots shown in FIG. 21) in the dataset is represented by the projection of its 300-dimensional SVO feature vector onto two dimensions using t-Distributed Stochastic Neighbor Embedding. The black line (travelling from center to upper right) shows how the dataset can be browsed (e.g., for people from sitting to standing to playing activities).

As shown in FIG. 22, the SVO embedding space clusters and distributed images containing similar activities and grey points are images that do not contain the title activity, and highlighted points are images that do. Rarer activities like waiting, moving, smiling, laying, and standing are mostly clustered in their own areas of the embedding space. A common activity, holding, which could mean anything from holding hands to holding a cup to holding a door open, happens in so many images that that action is distributed throughout the embedding space. The performance of the embedding space was evaluated using Top-1 accuracy for subject-verb-object triplet recognition. Random selection was used as a baseline for evaluation in conjunction with applying two constructed specific metrics for this task: open world and closed world. In the open world case, all possible action compositions (within train and test sets) are allowed. In the closed world case, only actions present in the test set are allowed. To capture both of these cases, the system also reported the harmonic mean between them, which punishes a large disparity between them. The current model performs significantly better than the baseline across all measured performance metrics (Table T2). Thus, various embodiments successfully create an embedding space that models actions/verbs as transformations that is an entirely novel representation.

TABLE 2

| Task | Current Model Accuracy | Random Selection | Improvement Over Baseline |
|---|---|---|---|
| Open World | 0.2543 | 0.0244 | 1042.2% |
| Closed World | 0.5092 | 0.1429 | 356.3% |
| Harmonic Mean | 0.3392 | 0.04168 | 813.8% |

Since another differentiating feature of some embodiments is to reduce lengthy videos down in time, but retain core content, an algorithm is required to automatically detect the most important regions of information in the video sequence (highlights) and ensure those are included in the final production video. This is accomplished through a temporal attention network, "Trash AttentionNet." TRASH's AttentionNet is an autoencoder network, trained on user videos, that identifies regions of interest in input videos by high encoder error of either the video or audio signal. Sections of footage with high encoder error indicate motion in the video, surprising sounds in the audio track, or camera movement related to moving from one scene to another and can be automatically recognized on the system. In some embodiments, regions of interest are identified by this network first, and then passed on to TrashNet for conceptual categorization.

Figure 23:
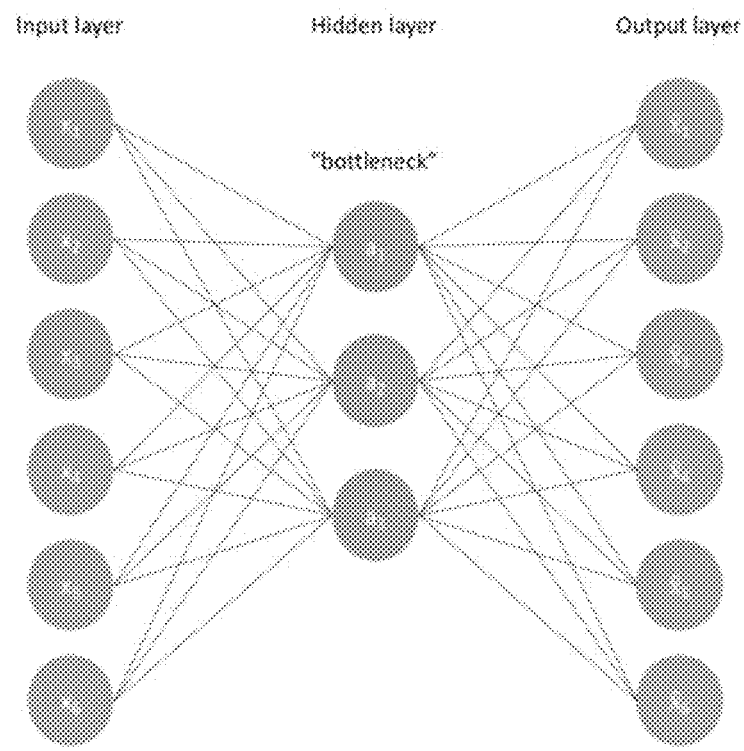
FIG. 23 is a diagram of an example network, according to one embodiment.

More specifically, in various examples, the AttentionNet input layer takes as input an encoded version of a video segment. FIG. 23 illustrates a simplified architecture of an autoencoding neural net. In this example, the network is trained by forcing the output layer to be equal to the input layer as closely as possible for each sample video. This produces a network that has learned what is typical in videos, and the network can then identify anything atypical—which is labeled as "interesting." The middle layer represents many layers of decreasing size. The smallest middle layer encodes all the information of the input layer in a smaller dimensional space. For example, the autoencoder is trained to minimize the difference between the original input data and its reconstruction of the input. By training an autoencoder on typical video segments ("uninteresting" clips), the system uses it to detect clips of interest because this is where the autoencoder would have the highest reconstruction error. The assumption is that what is not typical is interesting. By measuring the reconstruction error, the system can detect atypical and therefore interesting portions of videos—the highlights. In various embodiments, this includes unsupervised highlight detection in videos and is based on previously successful strategies.

An example evaluation includes a baseline audio-visual autoencoder, and evaluation of the CIFAR-10 dataset to train the image autoencoder, and the NSynth dataset to train the audio autoencoder. For two example autoencoders, evaluation includes analysis of a final reconstruction MSE loss (Table 3). These reconstruction losses are small enough that a large encoding error (the anomalies we are trying to discover) are noticeable, but not so small that no anomalies are likely to occur.

TABLE 3

|  | Training | Validation | Test |
|---|---|---|---|
| Audio Autoencoder | 0.0168 | 0.0151 | 0.0161 |
| Image Autoencoder | 0.0637 | 0.0637 | 0.0638 |

According to one example, using audio-visual attention, the system can identify and jump to interesting segments of a video (e.g. lion's roar in a video segment). In one example, decomposition of a video taken of a lion cage includes video in which the lion walks around its pen and then roars. Frames highlighted from the video cut out most of the lion's walk and jumps directly to clips of the lion roaring. Thus, execution of the AttentionNet algorithm is able to extract condensed highlight video footage from lengthy videos.

Narrative Sequence Generator Example

Another algorithm component than can be executed in various embodiments includes the "Narrative Sequencer." According to one embodiment, this neural network takes the set of clips filtered by TrashNet and sequences them into a narrative. In one example, the network takes a genre label as a conditioning variable that affects the character of the output sequence, changing the mood of the output video to happy or spooky, for example. For example, the production version of the app uses a set of heuristics to control the output sequence.

Rule Based Narrative Sequence Generator Example

Figure 24:
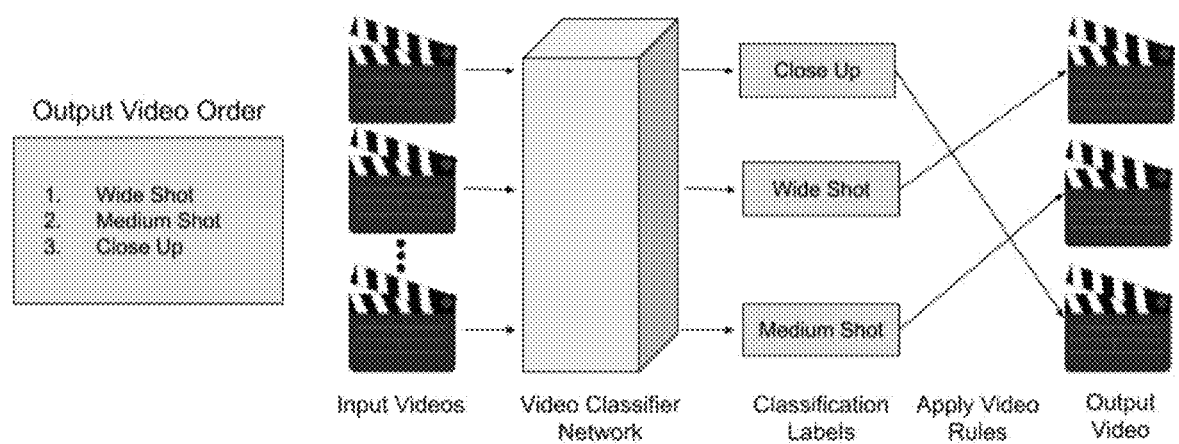
FIG. 24 is an example process flow, according to one embodiment.

According to one embodiment, a narrative sequence generator was developed as a simple rule-based reasoner (e.g., FIG. 24). For example, the app is configured to create videos that open on a "wide shot" and then proceed to a "close-up." This approach automatically generates a rough cut video that approximates a typical cinematic technique for enhancing drama. In addition, example rules prefer subsections of input video that include significant highlights as derived from the AttentionNet above. In one example, the system picks clips from the input videos to diversify the content of the output edited video. This means that if the input clips show the faces of several different people or animals and also have different landscape shots, the sequencer tries to make sure every unique person, place, or thing is still shown in the output edited video at least once.

Set to Sequence Generation Example

Figure 25:
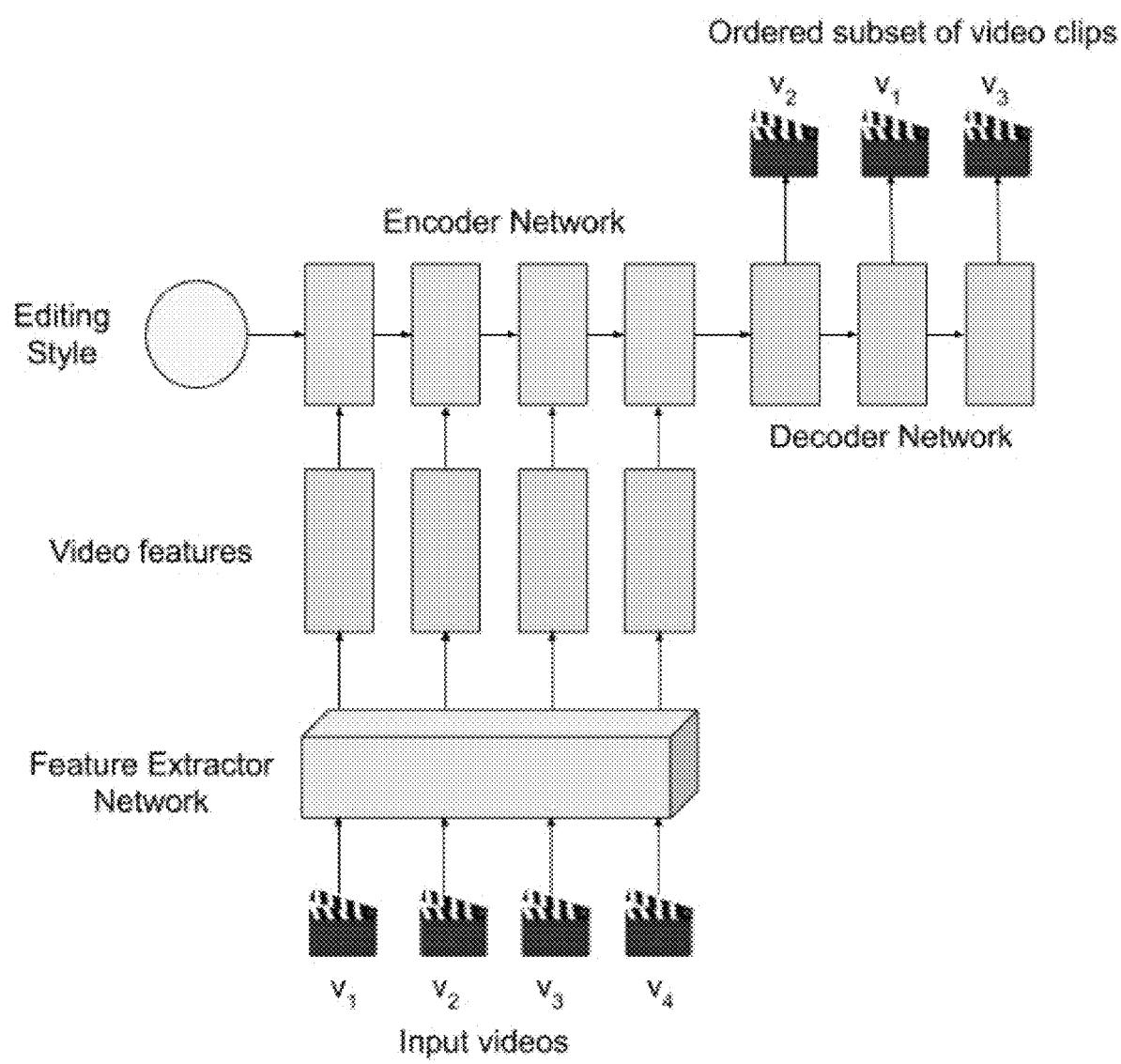
FIG. 25 is an example video processing flow, according to one embodiment.
Figure 26:
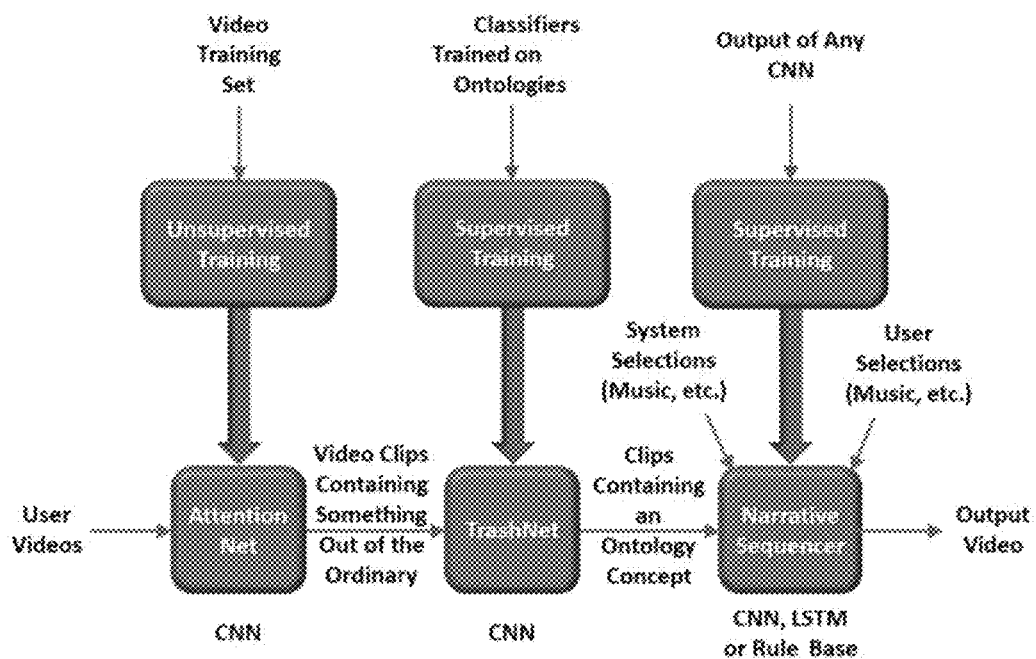
FIG. 26 is an example video processing flow, according to one embodiment.

According to some embodiments, the narrative sequence generator network uses an LSTM (Long Short-Term Memory), which is a recurrent neural network architecture often used in automatic translation. In the translation application, an LSTM maps an ordered set (a sentence in one language) to another ordered set (a sentence in the second language). To train a translation LSTM, the system uses pairs of corresponding sentences, the second of which is a translation of the first. In various examples, one innovation includes dropping a requirement that the first set be ordered Eliminating this constraint means that the system can feed the LSTM with an arbitrary set of video clips, which then get "translated" into a narrative sequence. In various embodiments, the processing system video generation pipeline (e.g., shown in FIG. 25) uses two LSTM networks, one to encode the information from a set of input clips, and one to decode the video into a narrative sequence.

To validate example constructions that execute set-to-sequence generation—an example set-to-sequence generation network was trained using a dataset of user videos and videos collected from the Internet Archive (IA). The captured videos are characteristic of content our users are currently shooting, and the dataset also includes movie trailers, fashion videos, sports footage, and historical film footage. Input videos were cropped into 2 second clips with a variable amount of intervening time. The input to the network is a set of these 2 second clips and the supervision against which the network loss is calculated is a subset of the input set that is arranged in chronological order from the original video from which the clips where taken.

The target validation goal established accurate sequence generation in cases that input clips contain videos from the same class as the target editing style. For example, input a random set of clips from an action movie and put them in an order for an action movie trailer. In this case, the machine learning model only has to identify which clips are from the target style and find a meaningful ordering for them. Further embodiments are configured to generate video sequences of a particular style when the input clips are made up of raw footage. For example, the model first recognizes salient characteristics of the target editing style and then selects and orders input clips that match target style.

In further embodiments, baseline tests were completed to evaluate network performance (Table 4).

TABLE 4

| Experiment Name | Train Accuracy | Test Accuracy |
|---|---|---|
| CNN Video Style Classification | 99% | 73% |
| LSTM Selection of Input Clips by Style (using two video editing styles: movie trailers, music videos) | Movie Trailers: 99% Music Videos: 96% | Movie Trailers: 63% Music Videos: 67% |
| Supervised Number Sort | 99% | 98% |
| Sort Even Numbers Only | 99% | 57% |
| Sort Odd Numbers Only | 99% | 57% |
| Supervised Video Son | 99% | 12% |

In various embodiments, the system started by training neural networks to classify videos from various editing styles. The models and training was then advanced to classifying and sorting videos. Further tests were executed on the general structure of the set to sequence sorting network by first sorting numbers. Solving these simpler, known solution sets first helped inform best approaches and implementation for video sequence generation.

Figure 27:
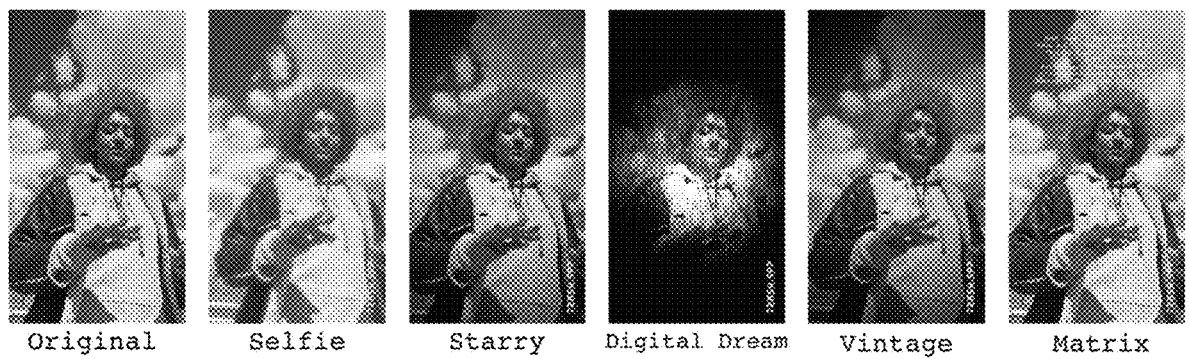
FIG. 27 illustrates example style effects, according to one embodiment.

In general embodiments, the architecture of the system/app's AI editing pipeline can include at least three elements, AttentionNet, TrashNet and the narrative sequencer discussed above. In the processing system app, a user selects input videos they would like to edit together. Behind the scenes, the app executes several steps across multiple algorithms to automatically generate a high-quality video output clip. When the algorithms are integrated at a system level, first AttentionNet finds video clips that are out of the ordinary, then TrashNet filters the clips to those matching a desired category from the Processing System ontology, and finally the videos ordered by a Narrative Sequencer to produce the output edited video. FIG. 27 illustrates an example editing architecture that can be implemented in various embodiments. Various embodiments of the described technology enable a fundamental shift in how users across widely varying demographics engage with the video editing process and expand accessibility to new user bases and levels of expertise (e.g., novice video editors).

In various examples, the system can be implemented as a mobile application interface integrated with advanced artificial intelligence algorithms to maximize speed and quality. Further embodiments incorporate additional functionality in a video editing platform to optimize which can include a social platform to drive a seamless user experience and content sharing. In one example, the current user records raw video using their mobile device and that video content will then be pushed to two locations including their mobile app and a social platform exchange market. The mobile app uses advanced AI, guided by the user persona profile, to produce high quality video for dissemination onto the social platform for viewing or export to other third-party social media. The user content will also be available on the social platform exchange market where it can be monetized as stock video that can be used to supplement and enhance other user videos.

In various embodiments, a suite of innovative algorithms are made available to users (e.g., via the mobile application or web-based interface, among other options) that make rapid, automated, high quality video processing capable on consumer devices. Each of these algorithms are part of an AI video editing engine available on the user's mobile device. In some embodiments, the system is configured to parse and sort raw video footage into distinct types of events and leverage a user persona profile to more accurately achieve results through constrained use cases. In one example, the system is configured to automatically parse scenes for the most relevant content using temporal and spectral changes. Once these clips are parsed and sorted, audio detection algorithms can be configured to assemble the clips back into meaningful story-based content in short time windows while dynamic music matching and augmented reality options are executed to optimize quality and professional appeal.

According to further embodiments, the system can be implemented on a mobile application with all functionality discussed herein, available locally on a user device, in additional embodiments, and/or alternatives, the functionality discussed herein can be implemented using a web-based interface to give access to the respective functions, and in still other embodiments and/or alternatives combinations of mobile application, web-based functions, and server supported functionality can be implemented to provide a robust editing platform that incorporates the functionality discussed herein.

Additional Feature Set Examples

In some embodiments, the functions of automatic rough-cut generation and finishing can be augmented by additional features and editing effects. According to various embodiments, the system can include processes for reviewing music submitted by users. For example, the system can include a web-based front end for music submission (e.g., a "TRASH for Artists" (TFA) website). In various embodiments, approved tracks can be published in a video application and made available to the application's user base and/or to automated video and soundtrack integration functionality.

According to one embodiment, users can use published music from independent musicians in their video creations. For example, the process can include: upload of artist tracks onto the TFA platform; supervised review of the music submission; and clearance of copyright issues (e.g., uploaded music needs to be owned by the person uploading the tracks). In one example, the music integration platform is configured to provide both the artist and the system the flexibility to remove music if there are distribution issues from the artist or infringement issues from the company. Various embodiments can include enhanced music integration and/or matching functionality. Some embodiments provide an administrative panel for supervised tagging of music, tracks, etc., in the application. In further embodiments, the supervised tagging can be used to train dynamic music matching neural networks.

According to one embodiment, the system executes at least three components for enabling functionality to tag music so that the labeled music is displayed correctly in the app, and/or to enable automatic music selection and integration. In one example, the system develops and identifies tags, tracks, and playlists. In some embodiments, the system has a library of tags that can be organized to range from qualitatively describing the genre, mood, and/or the visuals that the music evokes. Some examples of tags are #hiphop, #chill, and #driving. In various embodiments, human supervised tagging can be used to label a track when it is reviewed to ensure the music is categorized. In one example, playlists can be created using tags, so when you add a tag to a playlist, all the songs in that tag are included in the playlist. For example, the Cruisin' playlist is comprised of the following tags: #laidback, #westcoast, #roadtrip, #travel, #cali, #traveling, #cruisin, and #driving.

Further embodiments can include presentation style to provide effect for uploaded images and/or video. For example, the application can enable introduction of various style effects. FIG. 27 illustrates some example styles that a user can select and use on their creations. Currently, the most popular new style is Starry, which adds sparkly stars around a central image object (e.g., a person's body). Further embodiments include depth of field effects. For example, depth of field effects can be configured to introduce differential blurring of background and foreground in order to simulate the appearance of analog deep or shallow depth of field. In some examples, the system/application is configured to identify an attention area (e.g., system determined focus area, a system determined "interesting" area (e.g., via AttentionNet), among other options), and use the area of interest to achieve variable depth of field, sometimes called the Bokeh effect. In various implementation, the application can execute this function at the same speed as video playback. Various levels of the Bokeh effect can be generated and/or presented in the application. In one example, the system can identify the subject's face as the area of interest, then present multiple options for blurring the rest of the image, each increasing in degree of blurring.

Additional embodiments can also include additional visual and/or audio effects. According to one embodiment, a "self-care" style is configured to mimic music video effects. In one example, the self-care style is configured to introduce lighting and coloring changes in an image or video sequence. In one embodiment, the system is configured to identify sky portions of image and/or video and change the color of the sky. The color changes can travel across the artist's content, move in random selected directions and area of effect, pulse or flash in synch with a soundtrack, among other options. Further examples include a system generated effect on people centered in a given frame, where the system is configured to introduce a light diffraction ripple effect around the person or people in the center of the frame.

Figure 28:
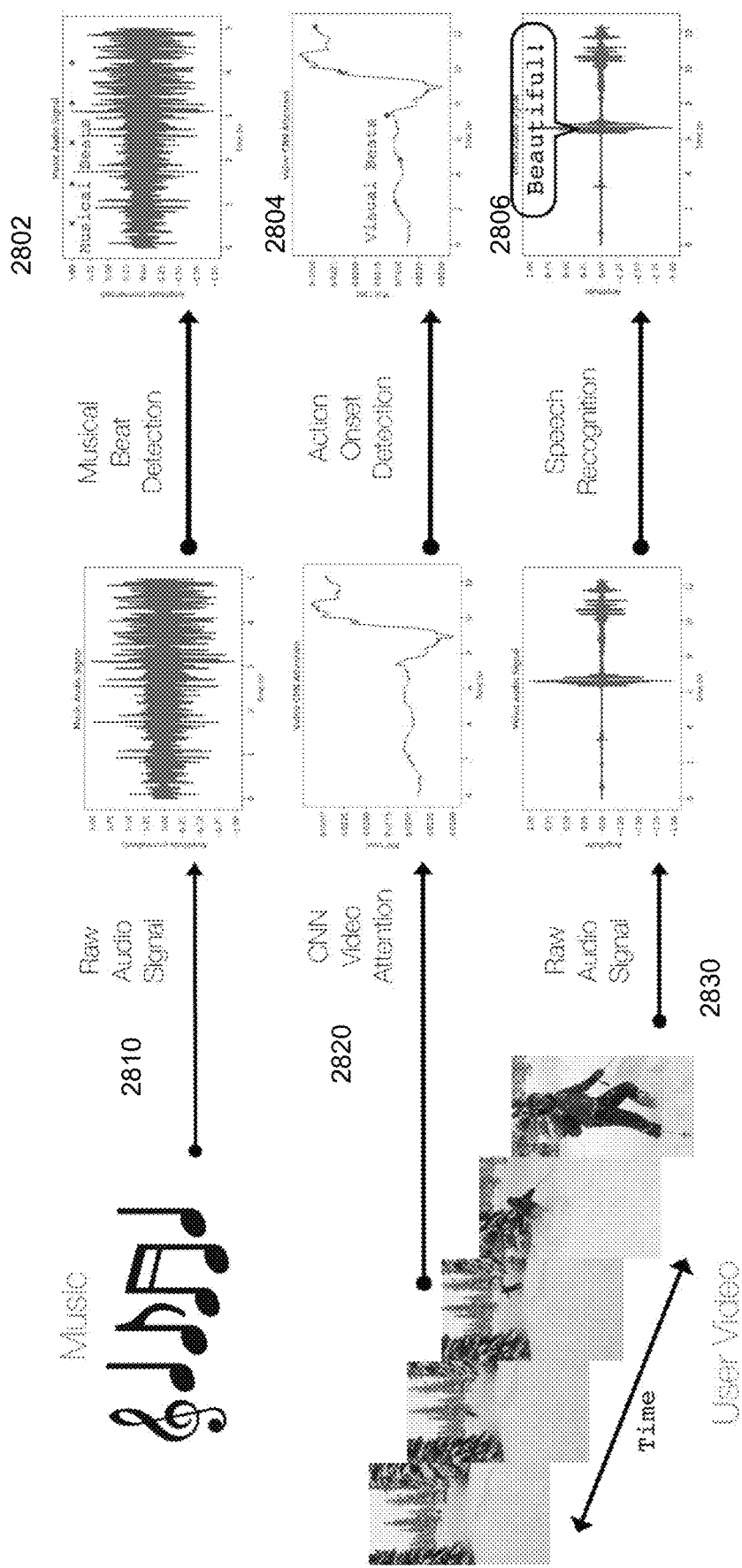
FIG. 28 is an example video processing flow, according to one embodiment.

Further embodiments can include features to augment rough-cut generation and/or editing features. For example, various embodiments are configured to capture and analyze dialog in user video segments. The captured dialog can be used by the system in generating automatic edits in user video to create the rough-cut output. For example, the system is configured to edit video with spoken dialog into a coherent storyline. According to one embodiment, the system analyzes dialog to identify the most important spoken words in a user's raw footage and apply such exclamations over a version of the raw input re-timed to match foreground movement and/or to match the beat of the selected music track. FIG. 28 illustrates this process.

As shown in FIG. 28, a library of music is available where each track is associated with estimated beat timings (e.g., 2082). In various embodiments, the system operates to pre-calculate beat timings for any song in the library (e.g., at 2810), where raw audio from music is analyzed to capture beat timing. At 2820, user video is processed to identify interesting actions (as described above) and associated the onset of interesting actions for use in editing. In one example, the system can label the onset of interesting actions as visual beats. In the example show in FIG. 28, the attention CNN employs a periodic loss function relating to the skier in the source video, which identifies the person in the video switching direction back and forth as they ski down the mountain. The system uses these interesting peaks (e.g., change of motion) and identifies that the visual beats approximately align with the detected beat times. In some embodiments, the system is configured to re-time the source video to make the foreground person seem like they are "dancing" to the music. In further example, the system is able to deliver this functionality in the context of a mobile application without adding significant computational overhead to our editing process. Shown at 2830, speech detection is integrated into the process, and used to highlight spoken exclamations in the source video. The inventors have realized that maintaining these important words not only builds a more complete rough cut but makes the final video personal and engaging to the users.

According to one embodiment, the mobile application can include multiple interfaces and navigation tools to facilitate use of the automatic editing and social aspects of video creation and sharing. In one embodiment, the app was configured to display user video clips sorted by the date they were created. When users recently downloaded videos from friends or family in a group chat, or downloaded a video from the TRASH app to remix, the user could be challenged to find their own creation or video. Further embodiments added the option (and/or default) to order the videos by date added. In order to resolve issues associated with known mobile platforms and limitations of associated operating systems, further embodiments execute a hybrid organization structure. For example, Apple's SDK does not support ordering all of the camera roll videos by date added, but rather only a small subset of recently added videos. One embodiment is configured to list the first few dozen most recently added videos provided by the SDK, followed by the remaining videos, ordered by creation date.

Further user interface features include visualization to establish whenever multiple video clips are available and design patterns for tapping through videos horizontally. Further examples include options for an auto-advance functionality to go to the next video when the video finished playing. In some embodiments, the user interface can include display of "coach marks," a software design pattern where an informational overlay shows the gesture the first time the user opens the app.

Further embodiments include a home view with two tabs: suggested videos to watch and videos from people you follow. The user interface can also display options to access lists of people a user was following and the ability to see all the videos a user had created in a reverse chronological grid on their profile (so they could assess a user's taste before following). In addition, the user interface can include a notification display to notify users that they had a new follower. In one example, the app can include a "notifications" view with recent activity in the app including new followers, likes and videos from people they follow.

Example Feature Suites for AI Video Generation/Tools

According to some embodiments, the automatic editing feature can include automatic editing technology that trims and arranges input clips based on the dialogue in the input videos (and, for example, not solely on the visual appearance of the video content). Various examples rely on updated datasets of video with voiceover audio that is used to train neural networks. Multiple datasets were developed to overcome the difference in voiceover and dialog style videos in cell phone footage versus the commodity datasets that are currently available.

In one embodiment, the machine learning algorithm for dialog editing is trained to recognize the dialog in user source video, and to create cuts in the edited video output sequence that logically make sense as a story based on the sentences of dialog. According to one embodiment, the overall editing approach is tailored to approximately YouTube vlogger-style videos, which include, for example, jump cuts that edit out the silence between sentences "jumping" immediately to the next dialog the creator speaks. In further embodiments, the system and/or mobile application can include a user interface feature to allow users to accept and/or adjust the automatically identified edit points. In one example, the user interface can include an editing view that enables users to select options for their own videos based on the dialog cues that are automatically generated. In further embodiments, the system and/or mobile application is configured to capture information on users' updates or alterations to the identified dialog cues, and employ the user feedback in further training of machine learning models.

In one example, datasets we created were based on a video style called "voiceover" which uses the audio from the first track the user selects as the soundtrack for the video, and allows people to share videos with speeches, dialog, talking to the camera and more. In various embodiments, dialog editing can include identification of music beats, visual beats, and interesting expressions or exclamations. The automatically generated rough-cut output can integrate and time synchronize the respective beats with an emphasis on the interesting expressions.

In some embodiments, music matching functions can also be provided by the system and/or distributed mobile applications. For example, the CNN architectures discussed herein can be used to project user videos into a discrete embedding space. Operations within the embedding space are used to create output sequences of video. Some embodiments extend these operations to project music into a semantic embedding space, which yields matching between the video and music in the semantic space. The matches can become the source of recommended soundtracks for user source video based on the video's visual content. In one embodiment, a joint embedding space for the video classifiers and music tags was created. Similar to the construction in the video embedding space, the joint embedding space was first developed as a supervised learning approach (i.e., manual labels), that was then extended to predict tags.

Figure 30:
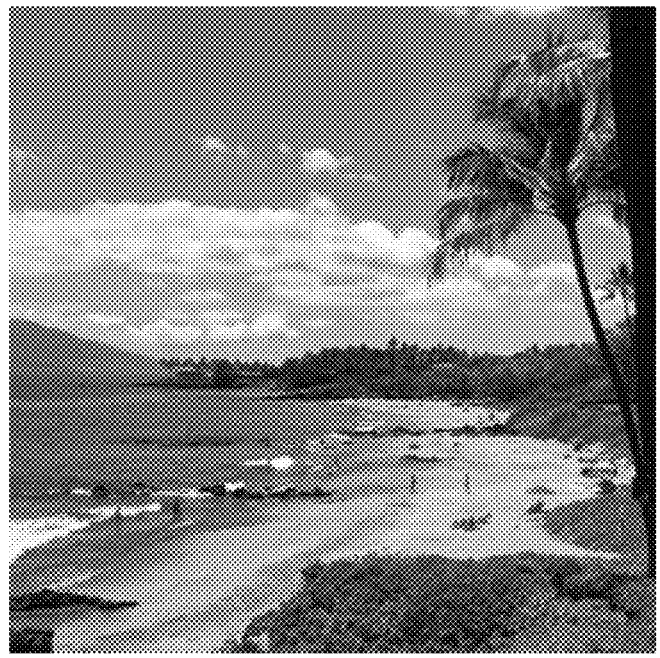
FIG. 30 is an example frame of user sourced video, according to one embodiment.

According to various embodiments, the process for matching music starts with the user manually selecting input footage. The process can continue with extraction of features from the input clips using, for example, a convolutional neural network. In one example, the features extracted by the CNN from FIG. 30 are: "clouds, direct sun/sunny, natural, man-made, open area, far-away horizon, Hazy, Serene, Wide, Full Shot, Geometric, Shallow DOF, Deep DOF, Warm (tones), Face." In a further step, the input clip features are mapped to soundtrack tags using, in one example, a manually created dictionary generated by a film expert. In other examples, a soundtrack tags library is produced by an intelligent model configured to predict tags for input soundtracks.

According to one embodiment, the "clouds" feature maps to the soundtrack tags: "dreamy, slow, pretty, artsy, relaxed, cloudy, indie, atmospheric." The union of the tags that AI analysis of the "beach" scene's features map to are: "tropical, pretty, indie, atmospheric, relaxed, cloudy, artsy, dreamy, slow, happy, nature." The process then employs the joint embedding space to retrieve the correlated tagged soundtrack and project the video features on the music tags. In one example, priority is given to soundtracks whose assigned tags have the greatest overlap with the soundtrack tags derived in the previous step. For the footage shown in FIG. 30, the suggested soundtrack is: Motivation by Henvao and the soundtrack tags are: "relaxed, vocals, happy, chill." FIG. 30 is a frame from user sourced video where identified features include "clouds" and "beach," which are then automatically mapped to music tags.

The process may optionally continue with audio beat timing analysis for the chosen soundtrack (e.g., which can be loaded from a server), and the output video is edited together from the selected input clips and the chosen soundtrack, based on extracted music information including beat analysis timing and song epochs (e.g., chorus, verse etc.). In some embodiments, music data (e.g., beat analysis, timing, and song epochs, etc.) allows the system and/or mobile application to synchronize the soundtrack to the edited video in a pleasing way.

Some embodiments are implemented using a manually labeled dataset of audio tracks. For example, a music and film expert listen to the tracks and labels them with five or more tag classifications. Each track once reviewed can have a number of tags (e.g., between one and twenty-three tags)—example tags include "dreamy, chill, low fi, longing" among other options. In various embodiments, the tags are descriptive in nature, and are selected to provide information on both mood and genre. In various embodiments, moods are leveraged (in addition to other features) for the dynamic music matching of the video. Various examples were explored and evaluated—more than five but less than fifteen tags were determined to provide a good range of description for the matching (so that the users get a good variety of soundtracks suggested by our AI). In other embodiments, fewer or greater numbers of tags can be used. In further embodiments, multiple datasets were cross-referenced to create a final taxonomy for a music catalog. In other embodiments, predicted tags can be used, and hybrid expert tag and AI tag libraries can be used for automatically matching music. In still other embodiments, the joint embedding space is configured to predict the video classifiers and music tags so that both project to a numerical output.

Figure 31:
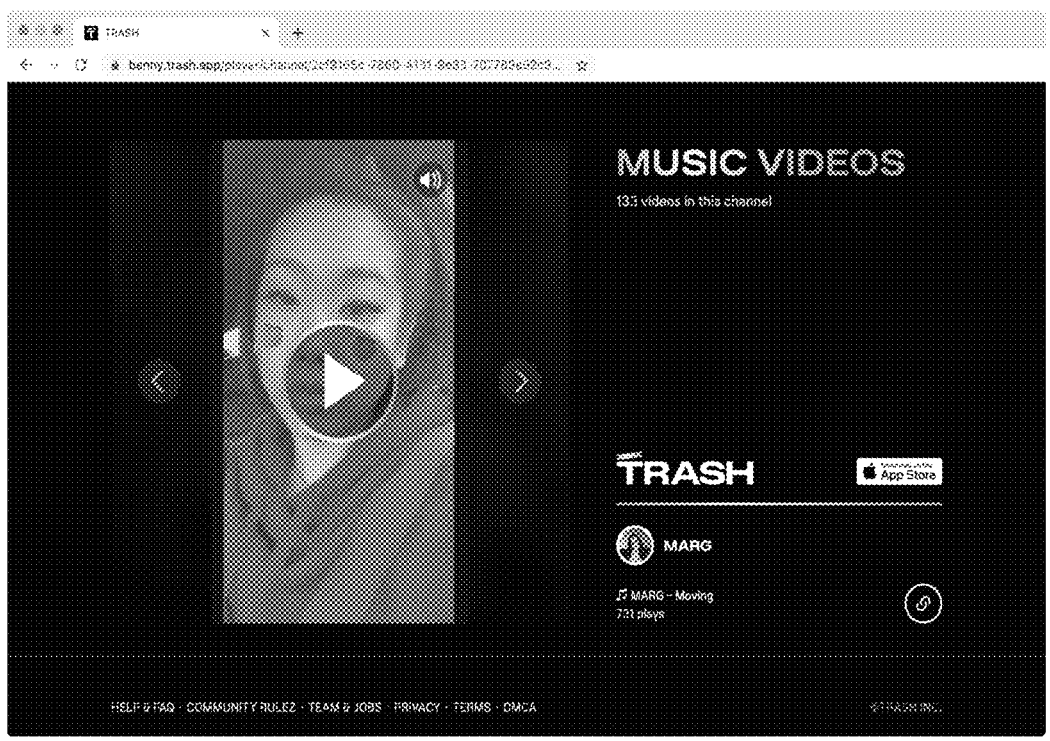
FIG. 31 is an example screen capture of a web-based interface, according to one embodiment.

According to some embodiments, additional functionality can be provided for user interaction and social supported sharing of video clips, edited footage, and final productions. In addition to the mobile application, various embodiments and/or alternatives include a presence for automatic video editing/sharing so that users can post, browse, and consume videos from a browser without having to install an app. FIG. 31 illustrates a screen capture of an interface for browser based access. In some embodiments, the system can include a web-based video player that plays content both for individual videos, as well as for a channel of videos (e.g., where the user can advance through the channels to watch more content). In various examples, the experience was enhanced to have enticing previews, for display on common social platforms like Twitter, Facebook Messenger and more. In further embodiments, when users share videos on those social platforms now, the recipient can watch the video directly in their browser.

Further embodiments are configured to (1) enable users to first share clips with each other through "sampling" them on the video editing system/application platform, and (2) establish a marketplace whereby users could purchase clips of video. In one embodiment, the system/application is configured to provide an initial sampling experience so that users can tap a button displayed in the UI, "Sample," on any video on the platform, which triggers the system/application to save the video to their device (e.g., camera roll) so that then the user can create a new video with it. Various embodiments implement the clip sharing feature alone and/or in conjunction with the marketplace feature.

Turning to the marketplace functionality, the application can include options for client-side functions that allow users to upload additional content outside of what they are able to record with their phones. In one example, the application enables access to content from additional sources such as WHY and the Internet Archive. In one example, the system/application provided access to a content channel specifically for the Grammy nominated artist, where the artist invited his fans to sample and remix his content in his channel. For example, the artist added content (clips) specifically for sampling (exchanging) so that users could reinterpret his music video and share their creations.

Figure 16:
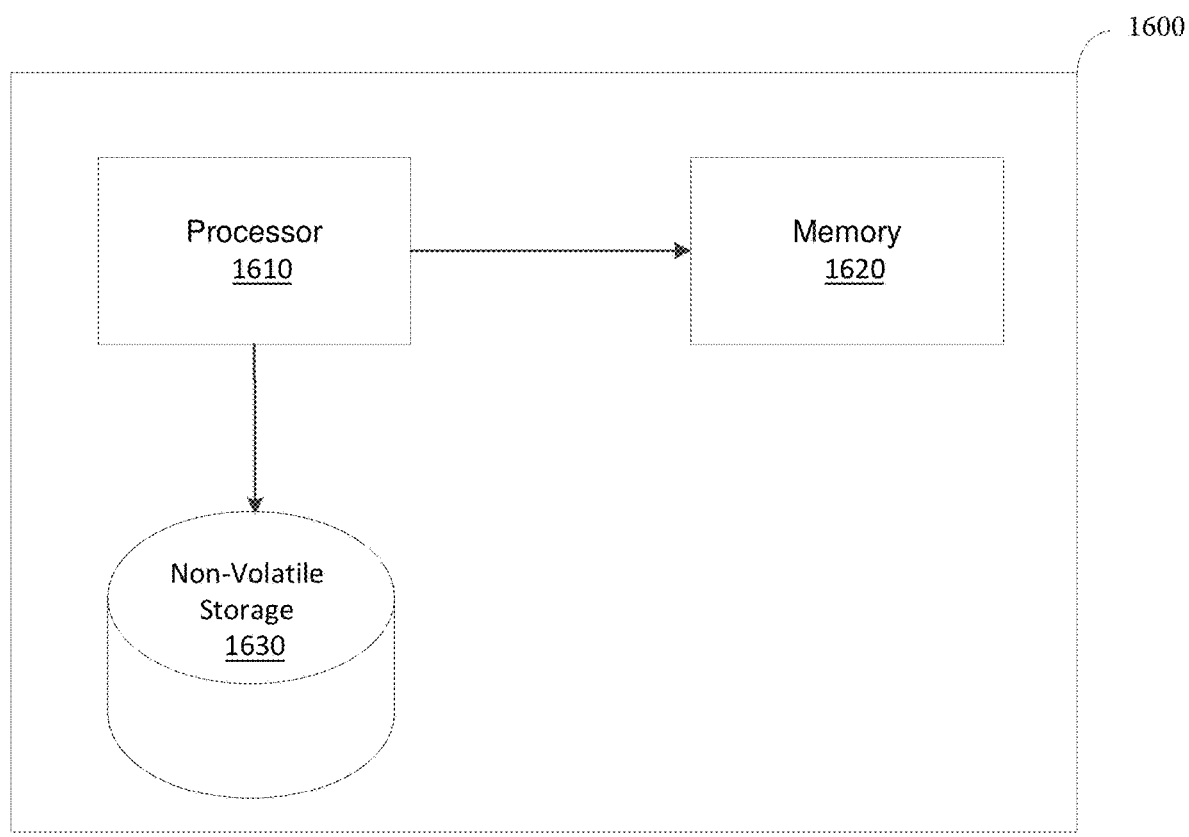
FIG. 16 is a block diagram of an example a distributed system which can be improved according to the functions described herein, according to some embodiments.

An illustrative implementation of a computer system 1600 that may be used in connection with any of the embodiments of the disclosure provided herein is shown in FIG. 16. The computer system 1600 may include one or more processors 1610 and one or more articles of manufacture that comprise non-transitory computer-readable storage media (e.g., memory 1620 and one or more non-volatile storage media 1630). The processor 1610 may control writing data to and reading data from the memory 1620 and the non-volatile storage device 1630 in any suitable manner. To perform any of the functionality described herein, the processor 1610 may execute one or more processor-executable instructions stored in one or more non-transitory computer-readable storage media (e.g., the memory 1620), which may serve as non-transitory computer-readable storage media storing processor-executable instructions for execution by the processor 1610.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein. Processor-executable instructions may be in many forms, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. A video processing system, comprising:
  a user interface component, executed by at least one processor, configured to:
    accept a first user sourced video as input;
    load the first user sourced video into memory;
    display editing operations, including at least one automatic editing function in association with a display of the first user source video;
  a video processing component, executed by at least one processor, configure to:
    analyze video segments of the first user sourced video input, the video segments each having a duration;
    execute a first machine learning process to transform the video segments into a semantic embedding space defining multiple dimensions and comprising numerical representation of the respective video segments in the multiple dimensioned space; and
    classify the transformed video segments into at least one of contextual categories or spatial layout categories based on determining similarity between classified video segments, the determination of the similarity including comparison of the numerical representation to numerical representations of the classified video segments;
    edit automatically at least one video segment of the first user sourced video input, the edit including at least one of altering the duration of the at least one video segment or introducing at least one visual effect into the at least one video segment;
    link or interleave a set of video segments including the edited at least one video segment based at least in part on the contextual or spatial layout categories to generate a sequencing of video; and
    wherein the user interface component is further configured to generate a rough-cut video output including the sequence of video.

2. The system of claim 1, further comprising a narrative component configured to:
  automatically identify using a second machine learning process a narrative goal based on analysis of the user sourced video input; and
  define a new sequencing of the first user sourced video to convey the narrative goal based on a third machine learning algorithm trained on film-based categorizations of video segments, the film based categorizations including at least cinematic style.

3. The system of claim 1, wherein the video processing component includes at least a first neural network configured to transform the video input into a semantic embedding space.

4. The system of claim 3, wherein the first neural network comprises a convolutional neural network.

5. The system of claim 4, wherein the video processing component further comprises a second neural network configured to determine a narrative goal associated with the user sourced video or the sequence of video to be displayed.

6. The system of claim 5, wherein the second neural network comprises a long term short term memory recurrent network.

7. The system of claim 3, wherein the first neural network is configured to classify user video into visual concept categories.

8. The system of claim 1, further comprising a second neural network configured to classify visual beats within user sourced video.

9. The system of claim 8, wherein the video processing component is further configured to automatically select at least one soundtrack for the user sourced video.

10. The system of claim 1, wherein the numerical values from the embedding space are input into a neural network to output a matching film idiom for the video segments of the first user sourced video input.

11. A computer implemented method for automatic video processing, the method comprising:
generating, by at least one processor, a user interface;
accepting, via the user interface, a first user sourced video as input;
display, by the at least one processor, editing operations within the user interface, including an act of displaying at least one automatic editing function, in association with a display of the first user source video;
analyzing video segments of the first user sourced video input, the video segments each having a duration;
transforming, by the at least one processor, the video segments into a semantic embedding space defining multiple dimensions and comprising numerical representation of the respective video segments in the multiple dimensioned space, responsive to execution of the at least one automatic editing function;
classifying, by the at least one processor, the transformed video segments into at least one of contextual categories or spatial layout categories based on determining similarity between classified video segments, the determination of the similarity including comparison of the numerical representation to numerical representations of the classified video segments;
editing, by the at least one processor, automatically at least one video segment of the first user sourced video input, the editing including at least one of altering the duration of the at least one video segment or introducing at least one visual effect into the at least one video segment;
linking or interleaving, by the at least one processor, a set of video segments including the edited at least one video segment based at least in part on the contextual or spatial layout categories to generate a sequencing of video; and
generating, by the at least one processor, a rough-cut video output including the sequencing of video.

12. The method of claim 11, wherein the method further comprises:
automatically identifying, by the at least one processor, a narrative goal using a second machine learning process; and
defining, by the at least one processor, a new sequence of the first user sourced video to convey the narrative goal based on a third machine learning algorithm trained on film-based categorizations of video segments, the film based categorizations including at least cinematic style.

13. The method of claim 11, wherein the method further comprises executing at least a first neural network configured to transform the video input into a semantic embedding space.

14. The method of claim 13, wherein the first neural network comprises a convolutional neural network.

15. The method of claim 14, wherein the method further comprises determining, by a second neural network, a narrative goal associated with the user sourced video or the sequence of video to be displayed.

16. The method of claim 15, wherein the second neural network comprises a long term short term memory recurrent network.

17. The method of claim 13, wherein the method further comprises classifying user video into visual concept categories with the first neural network.

18. The method of claim 11, wherein the method further comprises classifying, by a third neural network, visual beats within user sourced video.

19. The method of claim 18, wherein the method further comprises automatically selecting at least one soundtrack for the user sourced video.

20. The method of claim 11, wherein the numerical values from the embedding space are input into a neural network to output a matching film idiom for the video segments of the first user sourced video input.

* * * * *